(12) United States Patent
Hoki et al.

(10) Patent No.: US 12,434,437 B2
(45) Date of Patent: Oct. 7, 2025

(54) STEREOLITHOGRAPHY APPARATUS AND METHOD FOR MANUFACTURING THREE-DIMENSIONAL OBJECT

(71) Applicant: SHASHIN KAGAKU CO., LTD., Kyoto (JP)

(72) Inventors: Tetsuo Hoki, Kyoto (JP); Akira Kuwabara, Kyoto (JP); Eiichi Tsukahara, Kyoto (JP)

(73) Assignee: SHASHIN KAGAKU CO., LTD., Kyoto (JP)

( * ) Notice: Subject to any disclaimer, the term of this patent is extended or adjusted under 35 U.S.C. 154(b) by 12 days.

(21) Appl. No.: 18/559,557

(22) PCT Filed: Aug. 5, 2022

(86) PCT No.: PCT/JP2022/030167
§ 371 (c)(1),
(2) Date: Nov. 7, 2023

(87) PCT Pub. No.: WO2023/058318
PCT Pub. Date: Apr. 13, 2023

(65) Prior Publication Data
US 2024/0227292 A1    Jul. 11, 2024

(30) Foreign Application Priority Data

Oct. 5, 2021   (JP) .................................. 2021-164071

(51) Int. Cl.
*B29C 64/282*   (2017.01)
*B29C 64/129*   (2017.01)
(Continued)

(52) U.S. Cl.
CPC .......... *B29C 64/282* (2017.08); *B29C 64/129* (2017.08); *B29C 64/214* (2017.08);
(Continued)

(58) Field of Classification Search
CPC ... B29C 64/282; B29C 64/129; B29C 64/214; B29C 64/236; B29C 64/245; B29C 64/386; B33Y 10/00; B33Y 30/00; B33Y 50/00
See application file for complete search history.

(56) References Cited

U.S. PATENT DOCUMENTS

| 6,903,798 B2 | 6/2005 | Shirota et al. |
| 11,254,049 B2 | 2/2022 | Matsubara et al. |

(Continued)

FOREIGN PATENT DOCUMENTS

| CN | 109228348 A | 1/2019 |
| DE | 60127512 T2 | 12/2007 |

(Continued)

OTHER PUBLICATIONS

International Search Report mailed Sep. 20, 2022 in corresponding PCT International Application No. PCT/JP2022/030167.

(Continued)

*Primary Examiner* — Michael M. Robinson
(74) *Attorney, Agent, or Firm* — OSTROLENK FABER LLP

(57) ABSTRACT

A projector of an exposer is movable in a second direction orthogonal to a first direction in a posture inclined so that center positions of two adjacent pixels are offset in the first direction, is configured to switch ON-OFF states of exposure light each time the projector moves a distance corresponding to the drawing pitch in the second direction, exposes a photo-curable material in a predetermined drawing area sequentially for a plurality of strip regions each extending in the second direction, and forms, in a case where a plurality of layers of the photo-curable material are each exposed while being laminated to obtain a three-dimensional object, a joint portion of two adjacent strip regions of the plurality of strip regions and causes an in-plane position of (Continued)

the joint portion to differ between at least two layers of the plurality of layers.

8 Claims, 33 Drawing Sheets

(51) Int. Cl.
  *B29C 64/214* (2017.01)
  *B29C 64/236* (2017.01)
  *B29C 64/245* (2017.01)
  *B29C 64/386* (2017.01)
  *B33Y 10/00* (2015.01)
  *B33Y 30/00* (2015.01)
  *B33Y 50/00* (2015.01)

(52) U.S. Cl.
  CPC .......... *B29C 64/236* (2017.08); *B29C 64/245* (2017.08); *B29C 64/386* (2017.08); *B33Y 10/00* (2014.12); *B33Y 30/00* (2014.12); *B33Y 50/00* (2014.12)

(56) References Cited

U.S. PATENT DOCUMENTS

| | | |
|---|---|---|
| 2002/0067400 A1 | 6/2002 | Kawase et al. |
| 2003/0214571 A1 | 11/2003 | Ishikawa et al. |
| 2004/0160590 A1 | 8/2004 | Koyagi et al. |
| 2017/0015058 A1 | 1/2017 | Ueda et al. |
| 2019/0022941 A1* | 1/2019 | Wu .................... B33Y 30/00 |
| 2019/0160743 A1 | 5/2019 | Matsubara et al. |
| 2020/0070405 A1 | 3/2020 | Barclay et al. |
| 2020/0353685 A1* | 11/2020 | Wynne ................ B33Y 30/00 |

FOREIGN PATENT DOCUMENTS

| | | |
|---|---|---|
| EP | 3487704 B1 | 10/2021 |
| JP | 2003-340923 A | 12/2003 |
| JP | 2004-249508 A | 9/2004 |
| JP | 3938714 B2 | 6/2007 |
| JP | 2010-089438 A | 4/2010 |
| JP | 2017-124631 A | 7/2017 |
| JP | 2018-020521 A | 2/2018 |
| JP | 6438919 B2 | 12/2018 |
| JP | 2020-023064 A | 2/2020 |
| WO | WO 2020/031989 A1 | 2/2020 |

OTHER PUBLICATIONS

Written Opinion mailed Sep. 20, 2022 in corresponding PCT International Application No. PCT/JP2022/030167.
Notice of Reasons for Refusal dated Oct. 26, 2021 in corresponding Japanese Patent Application No. JP 2021-164052 and machine English language translation obtained from the JPO.
Office Action dated Feb. 10, 2025 in corresponding German File No. 11 2022 004751.8 and an English translation.

* cited by examiner

STEREOLITHOGRAPHY APPARATUS AND METHOD FOR MANUFACTURING THREE-DIMENSIONAL OBJECT

CROSS-REFERENCE TO RELATED APPLICATIONS

The present application is a 35 U.S.C. §§ 371 national phase conversion of International Application No. PCT/JP2022/030167, filed Aug. 5, 2022, which claims priority to Japanese Patent Application No. 2021-164071, filed Oct. 5, 2021, the contents of both of which are incorporated herein by reference. The PCT International Application was published in the Japanese language.

TECHNICAL FIELD

The present invention relates to a stereolithography apparatus and a method for manufacturing a three-dimensional object.

BACKGROUND ART

Additive manufacturing is a processing method having a great advantage in capability of direct manufacturing of a complex three-dimensional object and is much more flexible than a conventional method for obtaining a three-dimensional workpiece by cutting, and its advantage has gained considerable attention in recent years.

A method called a free liquid level method is widely known as a prior instance of three-dimensional stereolithography as one example of additive manufacturing and is achieved by a scanning exposure system using a laser beam and a galvanometer mirror. A back surface exposure scheme called a regulated liquid level method is also known, in which exposure and hanging are alternated for manufacturing such that one layer of an object is manufactured by collective exposure using a DMD through glass from a side of a bottom surface of a container containing a photo-curable material, and then a space below the object is filled with the material by a necessary thickness while the object is hung (see Patent Document 1, for example).

As three-dimensional stereolithography, however, a method of applying a photo-curable resin to a planar surface and exposing the resin from above by laser scanning has become more prevalent in recent years. For example, a method of alternating spreading of a paste material called a slurry, which is obtained by kneading a mixture of a photo-curable monomer resin (liquid) and ceramic powder, onto a manufacturing table and exposure of a necessary region from above by laser scanning for curing of the resin to obtain a three-dimensional object is already known (see Patent Document 2, for example).

A method of performing high-speed exposure (drawing) by a scheme of feeding an exposure pattern while moving a DMD projector, for example, in a row direction of a mirror arrangement (a matrix) is also known. The scheme, however, is not necessarily suitable for high-definition drawing as a projected pixel size in the row direction is a minimum drawing unit. In light of the foregoing, as a scheme obtained by improving the exposure scheme, a scheme of inclining a DMD mirror with respect to a movement direction to allow for a finer minimum drawing unit for exposure is already known (see Patent Document 3, for example).

PRIOR ART DOCUMENTS

Patent Documents

Patent Document 1: Japanese Patent Application Laid-Open No. 2017-124631
Patent Document 2: Japanese Patent No. 6438919
Patent Document 3: Japanese Patent No. 3938714

SUMMARY

Problem to be Solved by the Invention

There is a growing need for an increase in size and area of an object as the advantage of three-dimensional stereolithography is more widely recognized. The increase in size of the object leads to an increase in time required for manufacturing process, so that any measures to increase efficiency of manufacturing process are naturally sought in terms of improvement in productivity.

In addition, it is necessary to stabilize exposure accuracy during manufacturing in a case where an object having a large size or a large area is manufactured.

The present invention has been conceived in view of the above-mentioned problem, and it is an object of the present invention to provide a stereolithography apparatus having exposure accuracy suitably secured even in a case where an object has a larger size.

Means to Solve the Problem

To solve the above-mentioned problem, a first aspect of the present invention is a stereolithography apparatus for obtaining a three-dimensional object, including: an exposer configured to expose a photo-curable material according to an exposure pattern generated in advance based on three-dimensional shape data; and a controller configured to control operation of the stereolithography apparatus, wherein the exposer includes a projector that includes a plurality of pixels in a two-dimensional arrangement and is configured to individually switch ON-OFF states of exposure light at the respective pixels, the projector is movable in a second direction orthogonal to a first direction in a posture inclined with respect to the second direction so that center positions of two adjacent pixels of the plurality of pixels are offset by a predetermined drawing pitch in the first direction, and is configured to switch the ON-OFF states of the exposure light each time the projector moves a distance corresponding to the drawing pitch in the second direction, and the controller causes the projector to expose the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern while alternating forward movement and backward movement in the second direction with intervening step movement in the first direction, and forms, in a case where a plurality of layers of the photo-curable material are each exposed by the exposer while being laminated to obtain the three-dimensional object, a joint portion of two adjacent strip regions of the plurality of strip regions and causes an in-plane position of the joint portion to differ between at least two layers of the plurality of layers.

A second aspect of the present invention is the stereolithography apparatus according to the first aspect, wherein, in a case where the plurality of layers of the photo-curable material are each exposed by the exposer while being laminated to obtain the three-dimensional object, the controller causes the in-plane position of the joint portion to differ among the plurality of layers.

A third aspect of the present invention is the stereolithography apparatus according to the second aspect, wherein the in-plane position of the joint portion when the projector exposes each of the plurality of layers is shifted by an integer multiple of L/N in the first direction from the in-plane position of the joint portion in a layer exposed first among the plurality of layers, where L is the drawing width, N is the number of laminated layers.

A fourth aspect of the present invention is the stereolithography apparatus according to any one of the first to the third aspects, further including: a manufacturing table; a dispenser configured to dispense a slurry as the photo-curable material onto the manufacturing table; and a sweeper configured to sweep the slurry dispensed onto the manufacturing table to form a slurry film having a predetermined thickness, wherein the controller repeats dispensing of the slurry by the dispenser and sweeping of the dispensed slurry by the sweeper to laminate a plurality of slurry films as the plurality of layers.

A fifth aspect of the present invention is a stereolithography apparatus for obtaining a three-dimensional object, including: a manufacturing table; an exposer configured to expose a photo-curable material according to an exposure pattern generated in advance based on three-dimensional shape data; a dispenser configured to dispense a slurry as the photo-curable material onto the manufacturing table; a sweeper configured to sweep the slurry dispensed onto the manufacturing table to form a slurry film having a predetermined thickness; and a controller configured to control operation of the stereolithography apparatus, wherein the exposer includes a projector that includes a plurality of pixels in a two-dimensional arrangement and is configured to individually switch ON-OFF states of exposure light at the respective pixels, the projector is movable in a second direction orthogonal to a first direction in a posture inclined with respect to the second direction so that center positions of two adjacent pixels of the plurality of pixels are offset by a predetermined drawing pitch in the first direction, and is configured to switch the ON-OFF states of the exposure light each time the projector moves a distance corresponding to the drawing pitch in the second direction, and the controller causes the projector to expose the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern while alternating forward movement and backward movement in the second direction with intervening step movement in the first direction, repeats, in a case where a plurality of layers of the photo-curable material are each exposed by the exposer while being laminated to obtain the three-dimensional object, dispensing of the slurry by the dispenser and sweeping of the dispensed slurry by the sweeper to laminate a plurality of slurry films as the plurality of layers and forms a joint portion of two adjacent strip regions of the plurality of strip regions, controls, when the plurality of slurry films are each formed, at least the dispenser and the sweeper so that each of the slurry films includes not only a first region but also a second region and a third region, the first region being a region in which application of the slurry is originally necessary for manufacturing of the three-dimensional object, the second region being a region set in a predetermined range closer to a sweeping start position of the sweeper than the first region is, the third portion being a region between the first region and the second region, causes a position of a center of gravity in a horizontal plane of each of the slurry films to substantially coincide with or be close to a position of a center of gravity in a horizontal plane of the manufacturing table, causes the exposer to expose the second region when exposing the first region according to the exposure pattern, and causes, when an m-th layer of the plurality of slurry films is formed, the dispenser to dispense the slurry onto the second region of an (m−1) layer of the slurry films, m being an integer equal to or greater than two.

A sixth aspect of the present invention is a method for manufacturing a three-dimensional object including an exposure step of exposing a photo-curable material according to an exposure pattern generated in advance based on three-dimensional shape data using a projector that includes a plurality of pixels in a two-dimensional arrangement and is configured to individually switch ON-OFF states of exposure light at the respective pixels, wherein in the exposure step, the projector is caused to expose, in a posture inclined with respect to a second direction orthogonal to a first direction so that center positions of two adjacent pixels of the plurality of pixels are offset by a predetermined drawing pitch in the first direction, the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern each time the projector moves a distance corresponding to the drawing pitch while alternating forward movement and backward movement in the second direction with intervening step movement in the first direction, and, in a case where a plurality of layers of the photo-curable material are each exposed in the exposure step while being laminated to obtain the three-dimensional object, a joint portion of two adjacent strip regions of the plurality of strip regions is formed, and an in-plane position of the joint portion is caused to differ between at least two layers of the plurality of layers.

Effects of the Invention

According to the first to the sixth aspects of the present invention, it can be suitably reduced that the presence of the joint portion affects manufacturing accuracy, and an object having a high dimensional accuracy can be obtained.

According to the fifth aspect, application of a biased load on the manufacturing table is suitably reduced even in a case where the object has a large weight, and reduction in manufacturing accuracy (exposure accuracy) caused by the biased load is suitably suppressed. In addition, in a case where the object has a small planar size, a slurry film having a necessary size can be formed using a slurry dispensed in a minimum necessary dispensing amount while application of the biased load to the manufacturing table is suitably reduced.

DESCRIPTION OF EMBODIMENTS

Figure 1:
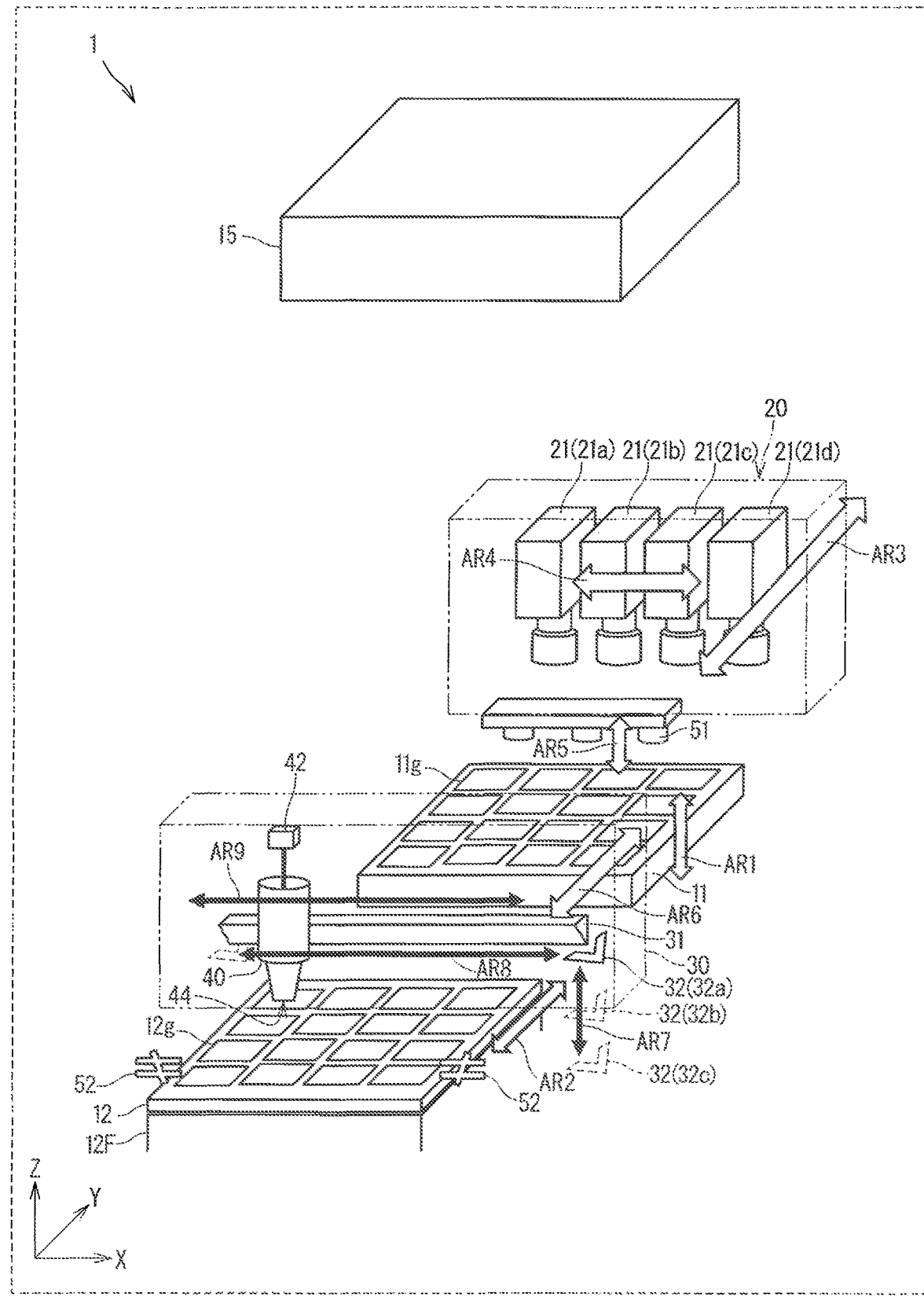
FIG. 1 is a perspective view illustrating a schematic configuration of a stereolithography apparatus 1.

A laser scanning scheme used in the free liquid level method is an exposure scheme advantageous for high-definition drawing as it allows for reduction in exposure spot diameter to a fine diameter and control of a pointing position at a drawing surface on the micron level. In a case of a laser scanning-type exposure scheme, however, exposure is basically scanning exposure at one point of laser light in which an outline and filled regions are sequentially exposed by the laser light as one continuous stroke. Exposure time per drawing area is thus substantially proportional to the drawing area. For example, there is an instance in which drawing of a 20 square centimeter area using laser light having a beam diameter of 30 µm requires a several tens of minutes for exposure per surface (layer).

On the other hand, in a case of collective exposure by DMD projector projection used in the regulated liquid level method, exposure time per area is extremely short in principle although it depends on an energy level. In a case of the DMD collective exposure scheme, reduced projection using an optical system allows for exposure at a fine pixel on the micron level but extremely narrows a drawing area in a single exposure, thus requires exposure by step & repeat, and sharply reduces manufacturing productivity. It is thus typical to balance productivity with projection exposure with a pixel size of 50 µm and the like. The pixel size inevitably becomes a minimum drawing unit. Sequential exposure by step & repeat is naturally similarly performed in a case where a large area is exposed, so that exposure time increases also in this scheme for fine drawing.

An exposure scheme as disclosed in Patent Document 3 has been used in an apparatus that exposes only one surface, for example, in exposure of a printed board. In exposure of the printed board, it is necessary to draw a large area of, for example, a 500 square millimeter on the micron level with a high definition, so that reciprocating drawing is typically performed in this exposure scheme. That is to say, the DMD projector alternates forward exposure and backward exposure (unit exposure) with a predetermined width while being shifted in a direction perpendicular to an exposure direction at a predetermined pitch each time one movement is completed to thereby expose a target region as a whole.

In this case, a state of exposure of a joint portion of adjacent unit exposure regions is different from that of the other portions in a strict sense. This rarely causes any substantial problem in a case of exposure of a single surface, for example, the printed board. Once the above-mentioned exposure scheme is applied to additive manufacturing, however, exposure is generally performed not for only one surface but each time a several tens of slurry films or 100 or more slurry films are sequentially laminated.

Patent Document 2 discloses a scheme of providing a liftable application mount (auxiliary table) on a side of a manufacturing table, dispensing a photo-curable material onto the application mount, and then stretching the material onto the manufacturing table by sweeping using a blade as measures to obtain an object that is large in a height direction. In this case, a position of the application mount is limited to a position on a side of the manufacturing table in principle, so that the object is typically formed at an end of the manufacturing table close to the application mount.

<Overview of Apparatus>

Figure 2:
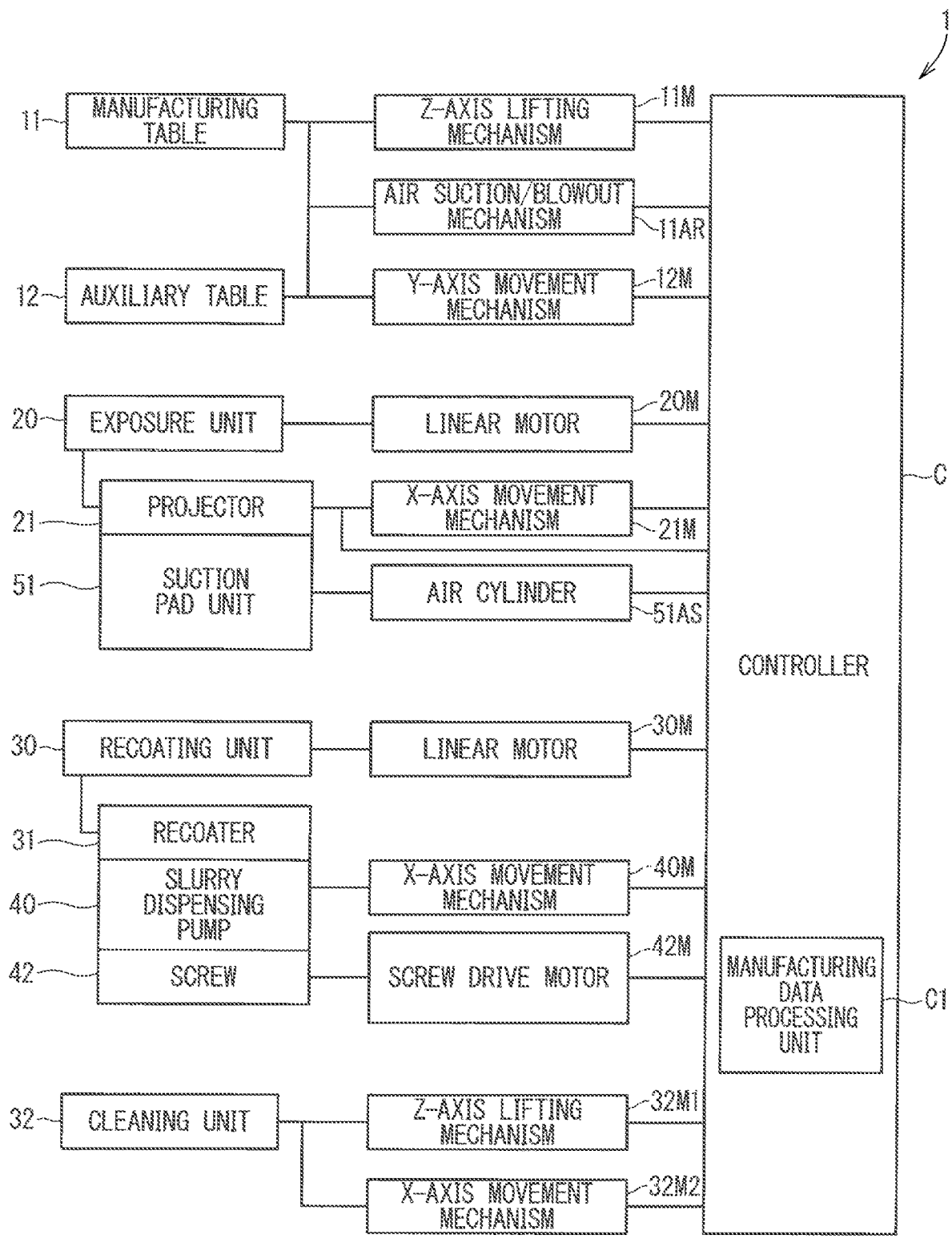
FIG. 2 is a functional block diagram of a portion of the stereolithography apparatus 1.
Figure 3:
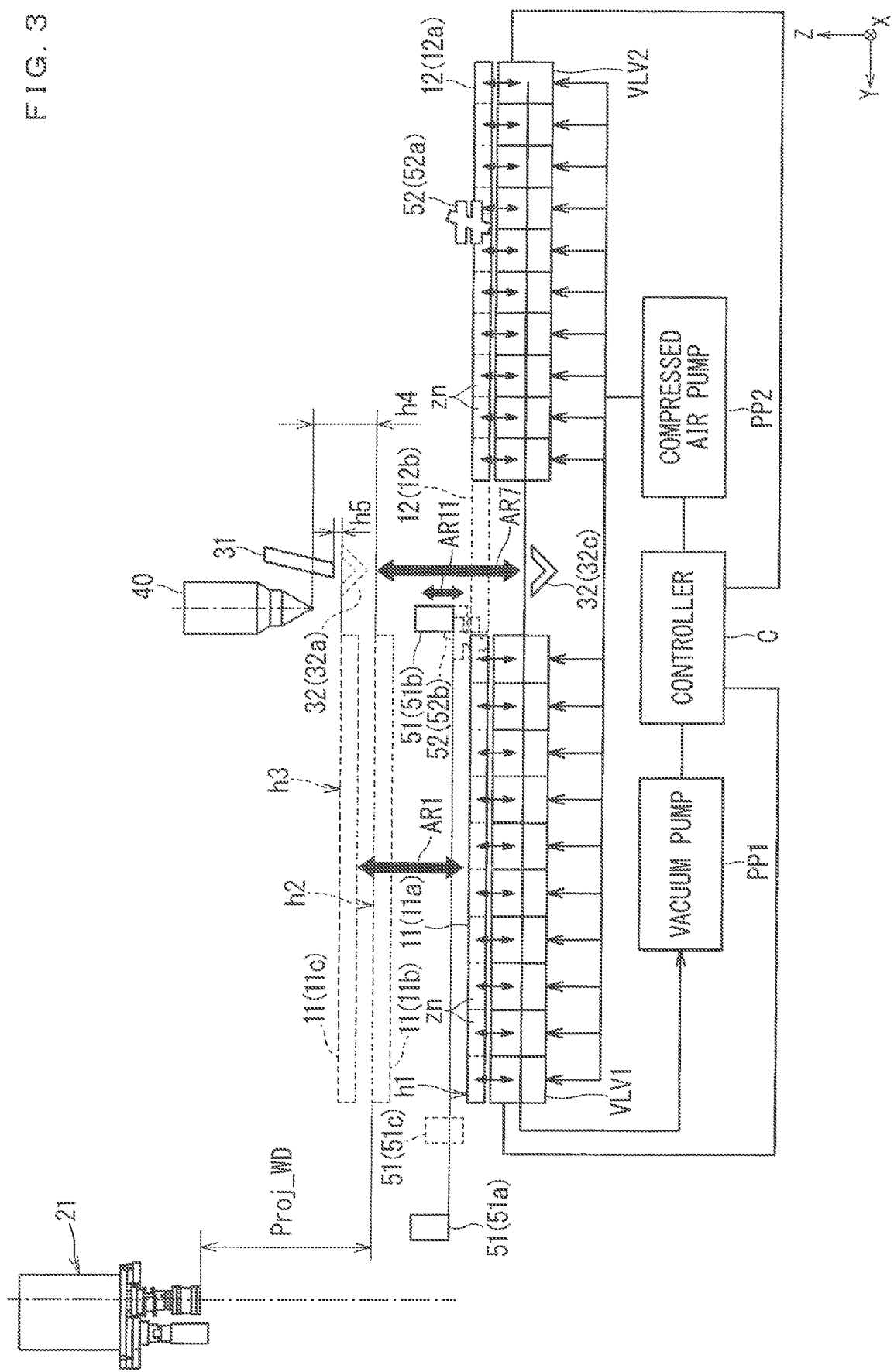
FIG. 3 is a side view illustrating an arrangement relationship among main components of the stereolithography apparatus 1.

FIG. 1 is a perspective view illustrating a schematic configuration of a stereolithography apparatus 1 according to the present embodiment. FIG. 2 is a functional block diagram of a portion of the stereolithography apparatus 1. FIG. 3 is a side view illustrating an arrangement relationship among main components of the stereolithography apparatus 1.

The stereolithography apparatus 1 according to the present embodiment is generally an apparatus that spreads a paste material called a slurry obtained by kneading a mixture of a photo-curable monomer resin (liquid) and ceramic powder (e.g., alumina) onto a manufacturing table and, for each of slurry films (layers) laminated sequentially, irradiates the obtained slurry film with light from a laser, an LED, and the like from above for exposure of a necessary region to cure the resin to thereby obtain a three-dimensional object (laminated body). Exposure based on exposure pattern data performed by the stereolithography apparatus 1 is hereinafter also referred to as drawing.

The stereolithography apparatus 1 mainly includes a manufacturing table 11, an auxiliary table 12, an exposure unit 20, a recoating unit 30, a slurry dispensing pump 40, and a controller C (FIG. 2). FIG. 1 is accompanied by right-handed xyz coordinates with a direction from the auxiliary table 12 to the manufacturing table 11 as a positive y-axis direction and a vertically upward direction as a positive z-axis direction (a similar coordinate system is used in subsequent drawings).

The manufacturing table 11 is a table that is rectangular in plan view and has an upper surface on which manufacturing is performed. The manufacturing table 11 is liftable in a z-axis direction as indicated by an arrow AR1. Lifting operation is achieved by a z-axis lifting mechanism 11M (FIG. 2). Specifically, the manufacturing table 11 is mainly moved among an initial position 11a (a height h1), a dispensing/exposure position 11b (height h2), and a recoating position 11c (height h3) as illustrated in FIG. 3.

The manufacturing table 11 is generally raised from the initial position 11a in application of a slurry and subsequent exposure and is lowered by a necessary amount each time formation of an object progresses (each time formation of each layer is completed).

The manufacturing table 11 preferably has a manufacturing area of at least 600 mm×600 mm or more, and more preferably has a manufacturing area of at least 650 mm×650 mm or more to enable manufacturing of an object having a large size.

The manufacturing table 11 has a plurality of suction grooves (grooves) 11g in the upper surface thereof. The plurality of suction grooves 11g are used when a film (e.g., protective film) laid on the upper surface of the manufacturing table 11 in manufacturing is fixed. The plurality of suction grooves 11g are provided over the entire manufacturing area. More specifically, the plurality of suction grooves 11g communicate with an air suction/blowout mechanism 11AR (FIG. 2), and the air suction/blowout mechanism 11AR applies a negative pressure to the plurality of suction grooves 11g with the film being laid to vacuum-suck the film under control performed by the controller C (one example of a control means of the present disclosure).

In transport after completion of the object, vacuum suction is released under control performed by the controller C, and air is supplied from the air suction/blowout mechanism 11AR to the suction grooves 11g instead. The object is thereby slightly floated from the manufacturing table 11 together with the film, making it easier to hold the film using a film gripper 52, which will be described below, and transport the film together with the object on the film.

The auxiliary table 12 is a table that is rectangular in plan view and is used for preparation of the film and transport of the completed object. The auxiliary table 12 has substantially the same planar size as the manufacturing table 11. The auxiliary table 12 is mounted and supported by a fixing part (support) 12F and is provided at the same height h1 as the initial position 11a of the manufacturing table 11 as illustrated in FIG. 3. The auxiliary table 12 is retractable in a y-axis direction together with the fixing part 12F as indicated by an arrow AR2. Specifically, the auxiliary table 12 is moved forward and backward between a normal position 12a and an adjacent position 12b adjacent to and flush with the manufacturing table 11 at the initial position 11a on a side in the positive y-axis direction. Moving operation is achieved by a y-axis movement mechanism 12M (FIG. 2) of the fixing part 12F. The y-axis movement mechanism 12M includes an actuator.

The auxiliary table 12 also has a plurality of suction grooves (grooves) 12g in an upper surface thereof. The plurality of suction grooves 12g are used when the film laid on the upper surface of the manufacturing table 11 in manufacturing is once fixed prior to laying. More specifically, the plurality of suction grooves 12g communicate with the air suction/blowout mechanism 11AR (FIG. 2) through the fixing part 12F, and the air suction/blowout mechanism 11AR applies a negative pressure to the plurality of suction grooves 12g with the film being laid to vacuum-suck the film. The film once laid on the auxiliary table 12 is transported to the manufacturing table 11 by a suction pad unit 51, which will be described below.

Furthermore, the auxiliary table 12 is removable from the fixing part 12F at the normal position 12a. That is to say, the auxiliary table 12 is portable to be carried separately from the y-axis movement mechanism 12M and the air suction/blowout mechanism 11AR. The stereolithography apparatus 1 according to the present embodiment can transport the object transferred to the auxiliary table 12 after completion together with the auxiliary table 12 by utilizing portability of the auxiliary table 12.

The air suction/blowout mechanism 11AR includes a vacuum pump (one example of a suction means of the present disclosure) PP1, a compressed air pump (one example of an air supply means of the present disclosure) PP2, and switching valves VLV1 and VLV2 as illustrated in FIG. 3, for example. The switching valve VLV1 and the switching valve VLV2 operate as switching devices that switch between suction by the vacuum pump PP1 and air blowout by the compressed air pump PP2 respectively on the manufacturing table 11 and the auxiliary table 12. The controller C controls the vacuum pump PP1, the compressed air pump PP2, and the switching valves VLV1 and VLV2 to switch between vacuum suction and air flotation of the film.

The plurality of suction grooves 11g are provided to be distributed to a plurality of mutually independent zones zn, and the switching valves VLV1 and VLV2 each switch between suction by the vacuum pump PP1 and air blowout by the compressed air pump PP2 for each of the zones zn. The suction grooves 11g in the zones zn are selectively used as appropriate according to the size and the position of the object in transport. While rectangular suction grooves 11g and 12g are in two-dimensional arrangements in FIG. 1, these arrangements are just examples, and the plurality of suction grooves 11g and 12g may be in other arrangements, for example, in stripes.

The exposure unit (one example of an exposure means) 20 is a light source that includes one or more projectors 21 each emitting light. Each of the projectors 21 includes a light emitting element, such as a laser and an LED. The exposure unit 20 is movable forward and backward in the y-axis direction as indicated by an arrow AR3. Moving operation is achieved by a pair of left and right linear motors 20M (FIG. 2), which is not illustrated in FIG. 1.

The projector 21 is an element that performs pattern exposure (projection) of an applied slurry film formed over the manufacturing table 11. The projector 21 performs exposure by a DMD projection scheme, for example. That is to say, a projection (exposure) pattern (data) is fed while the projector 21 is moved in steps or continuously in the y-axis direction to project the pattern. The projector 21 having completed movement in one direction is moved a predetermined distance in an x-axis direction and performs exposure again while being moved opposite in the y-axis direction. That is to say, exposure is performed in strips for each region having a predetermined width in the present embodiment. Operation described above is repeated until exposure is completed for the entire manufacturing target area in each layer.

More specifically, the projector 21 is disposed to be slightly inclined with respect to the y-axis direction and is moved in the inclined posture. A scheme used by the stereolithography apparatus 1 according to the present embodiment is thus also particularly referred to as an inclined exposure scheme. The inclined exposure scheme will be described in more detail below.

The projector 21 is disposed so that a lower end thereof is located at a height spaced upward along the z-axis from the dispensing/exposure position 11b of the manufacturing table 11 by a predetermined projector operation distance (Proj_WD).

The stereolithography apparatus 1 illustrated in FIG. 1 includes four projectors 21 (21a to 21d) provided at regular intervals in the x-axis direction, and the four projectors 21 perform exposure in synchronization with one another.

Movement in the y-axis direction of the projectors 21 is achieved by movement of the exposure unit 20 as a whole. On the other hand, movement in the x-axis direction indicated by an arrow AR4 is achieved by an x-axis movement mechanism 21M (FIG. 2). The x-axis movement mechanism 21M includes an actuator.

The recoating unit 30 is a whole unit of a recoater (one example of a sweeping means of the present disclosure) 31, the slurry dispensing pump (one example of a dispensing means of the present disclosure) 40, and a screw 42. The recoating unit 30 is movable forward and backward in the y-axis direction as indicated by an arrow AR6. Moving operation is achieved by a pair of left and right linear motors 30M (FIG. 2), which is not illustrated in FIG. 1. Guide rails for the linear motors 30M are preferably shared with the linear motors 20M for moving the exposure unit 20.

The recoater 31 is a blade-like member that sweeps and applies the slurry dispensed onto the manufacturing table 11. The recoater 31 is attached to the recoating unit 30 with a longitudinal direction thereof extending in the x-axis direction and has substantially the same size in the x-axis direction as the manufacturing table 11. The recoater 31 moves in the y-axis direction due to movement of the recoating unit 30 while maintaining a predetermined distance from the manufacturing table 11 and spreads the slurry dispensed onto the manufacturing table 11 in the y-axis direction to form a slurry film.

The recoater 31 after use is cleaned by a cleaning unit (cleaner) 32. The cleaning unit 32 is disposed at a position below one end side of the recoater 31 to lift among a use height 32a, a manufacturing standby height 32b, and a standby height 32c as indicated by an arrow AR7. In addition, the cleaning unit 32 is movable in the x-axis direction at the use height 32a as indicated by an arrow AR8. The cleaning unit 32 may include a spatula, a brush, and the like or may include another configuration.

After use of the recoater 31, the cleaning unit 32 disposed at the use height 32a moves in the x-axis direction while being in contact with the recoater 31 to remove a slurry adhering to (remaining on) the recoater 31. The recoater 31 is thereby cleaned.

In a case where application of the slurry is then repeated, the cleaning unit 32 waits at the manufacturing standby height 32b. After all applications end, the cleaning unit 32 waits at the standby height 32c until further use.

Movement in the z-axis direction of the cleaning unit 32 indicated by the arrow AR7 is achieved by a z-axis lifting mechanism 32M1 (FIG. 2). Movement in the x-axis direction of the cleaning unit 32 indicated by the arrow AR8 is achieved by an x-axis movement mechanism 32M2 (FIG. 2). The x-axis movement mechanism 32M2 includes an actuator.

The slurry dispensing pump 40 is a pump having a function of storing a slurry for manufacturing therein and dispensing the slurry onto the manufacturing table 11 in manufacturing. The slurry dispensing pump 40 is movable not only in the y-axis direction due to movement of the recoating unit 30 and but also in the x-axis direction by an x-axis movement mechanism 40M (FIG. 2) as indicated by an arrow AR9. The x-axis movement mechanism 40M includes an actuator.

The screw 42 responsible for slurry dispensing operation is attached to the slurry dispensing pump 40. The screw 42 is rotated by a screw drive motor 42M. The screw 42 is rotated in the slurry dispensing pump 40 to dispense the slurry from a lower end of the slurry dispensing pump 40. The amount of the slurry dispensed from the slurry dispensing pump 40 varies according to a rotational speed of the screw 42. A dispensing height h4 as a distance between the lower end of the slurry dispensing pump 40 and the dispensing/exposure position 11b of the manufacturing table 11 is set as appropriate by taking a material for the slurry and the like into account.

The stereolithography apparatus 1 further includes the suction pad unit (a suction carrier) 51 as one example of a suction transport means of the present disclosure and the film gripper 52 as one example of a holding transport means of the present disclosure as components responsible for movement of the film.

The suction pad unit 51 is a film suction mechanism to suck the film set on the auxiliary table 12 and relocate the sucked film onto the manufacturing table 11. The suction pad unit 51 normally waits at a standby position 51a (FIG. 3) set below a standby position of the exposure unit 20 and is incorporated into the bottom of the exposure unit 20 by unillustrated pin fitting when in use under control performed by the controller C. The suction pad unit 51 moves in a negative y-axis direction with movement of the exposure unit 20 and sucks an end in the positive y-axis direction of the film on the auxiliary table 12 at a suction position 51b as a position above an end in the positive y-axis direction of the auxiliary table 12 having moved to the adjacent position 12b. The exposure unit 20 moves in the positive y-axis direction while maintaining the suction state, so that the suction pad unit 51 moves to a termination position 51c to transport the film to the manufacturing table 11.

Suction and release of suction of the film are performed by upward and downward movement of the suction pad unit 51 as indicated by an arrow AR5. Upward and downward movement is achieved by an air cylinder 51AS. Air for drive is supplied from an unillustrated joint port provided in the exposure unit 20.

The film gripper 52 is a pair of film holding mechanisms used when the completed object is transported from the manufacturing table 11 to the auxiliary table 12. The film gripper 52 normally waits at a standby position 52a (FIG. 3) set below a standby position of the recoating unit 30 at opposite ends in the x-axis direction of the auxiliary table 12 and is incorporated into the bottom of the recoating unit 30 by unillustrated pin fitting when in use under control performed by the controller C. The film gripper 52 moves in the positive y-axis direction with movement of the recoating unit 30 and holds opposite ends of the film air floated together with the object at a holding position 52b set at opposite ends in the negative y-axis direction of the manufacturing table 11. The recoating unit 30 moves in the negative y-axis direction while maintaining the holding state, so that the film and the object mounted on an upper surface thereof are transported to the auxiliary table 12. In this case, zones zn to which suction grooves 11g and 12g receiving supply of air from the compressed air pump PP2 belong are sequentially switched according to movement of the object. That is to say, only suction grooves 11g and 12g necessary to air float the moving object are sequentially and selectively used.

In transport of the object, air supply from suction grooves 11g and 12g not located immediately below the film or suction grooves 11g and 12g not located immediately below the object may be stopped. This prevents blowout of a large amount of air from less loaded suction grooves 11g and 12g above which no film or object is present and allows for blowout of a sufficient amount of air from the suction grooves 11g and 12g located immediately below the object necessary to float the object. The controller C may determine a zone to which air is supplied according to a transport distance of the film or may detect a position of the film and/or a position of the object using a sensor and determine a zone to which air is supplied according to a result of detection.

The stereolithography apparatus 1 further includes a fan filter unit (FFU) 15 and the like. The FFU 15 is a mechanism to maintain cleanliness in the stereolithography apparatus 1.

Operation of each component of the stereolithography apparatus 1 having a configuration as described above is all controlled by the controller C (FIG. 2). The controller C can be achieved by a general-purpose or dedicated computer.

The controller C preferably includes a manufacturing data processing unit C1 that converts three-dimensional shape data (CAD data) of a manufacturing target into projection (exposure) pattern data usable for exposure in strips for each layer by the projector 21. Slice data generated by the manufacturing data processing unit C1 is sequentially used for pattern exposure by the projector 21.

The manufacturing data processing unit C1 may be provided as a computer separate from the controller C.

<Operation of Stereolithography Apparatus>

Figure 4:
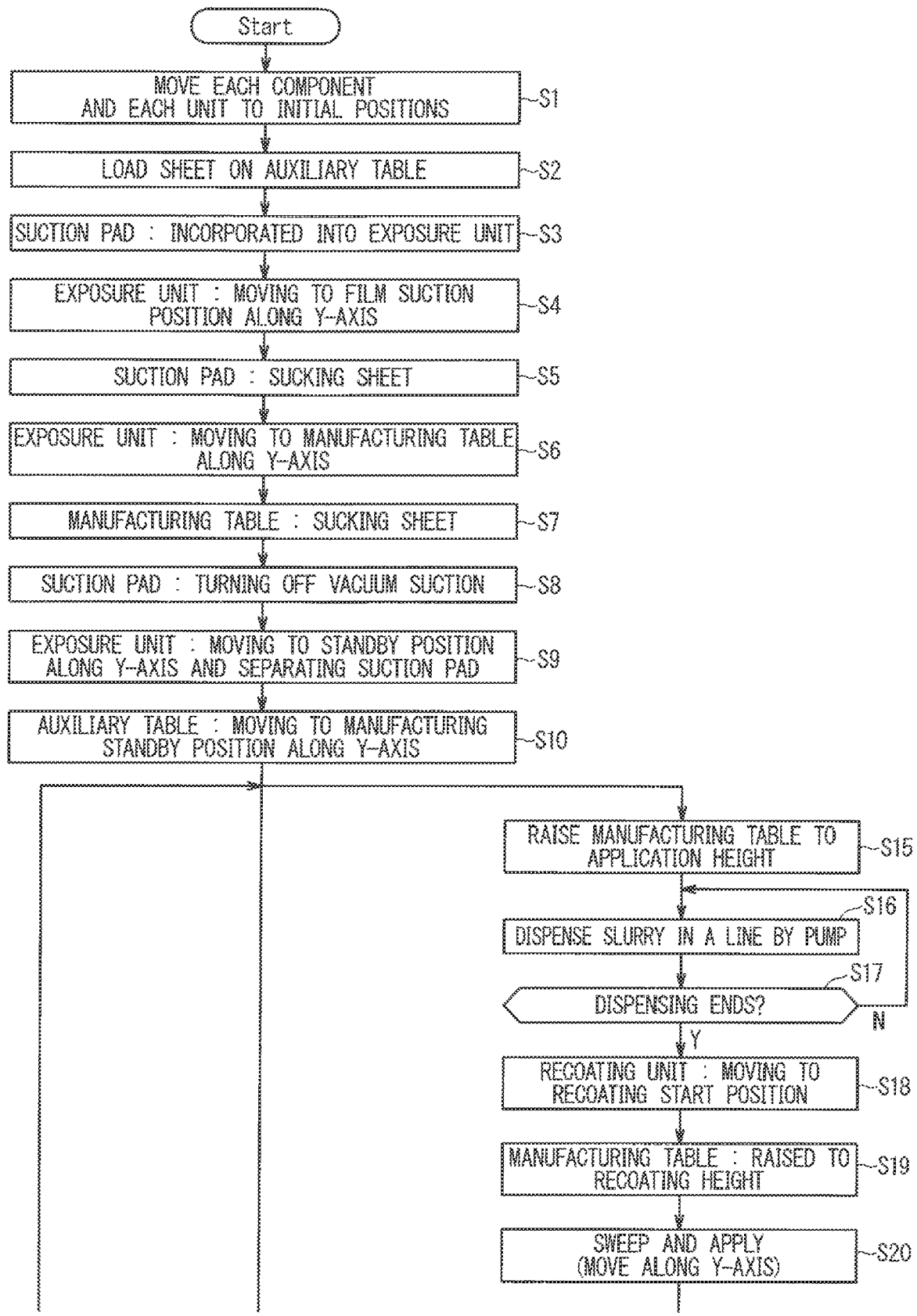
FIG. 4 is a flowchart showing a series of operations of the stereolithography apparatus 1.
Figure 5:
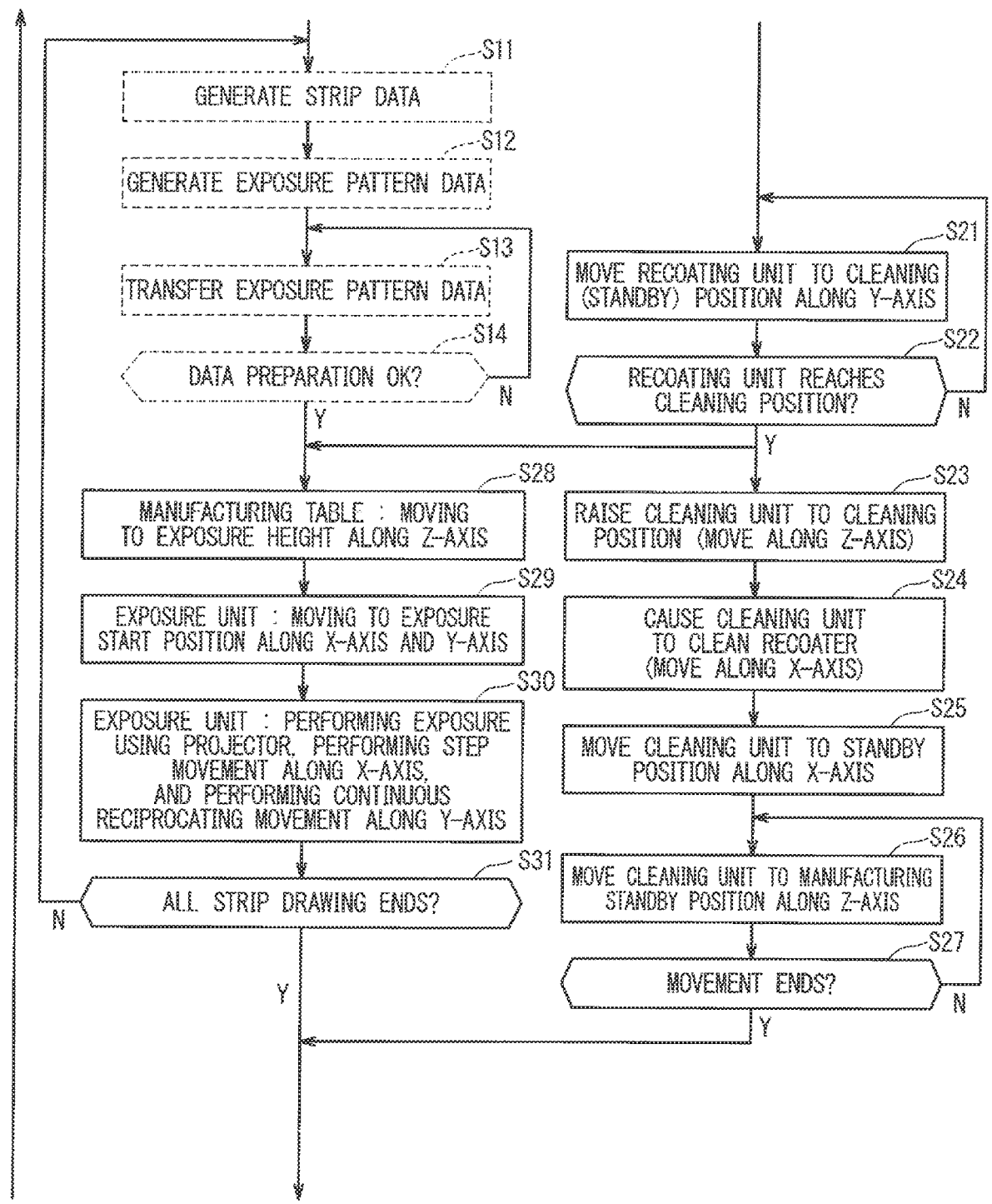
FIG. 5 is a flowchart showing a series of operations of the stereolithography apparatus 1.
Figure 6:
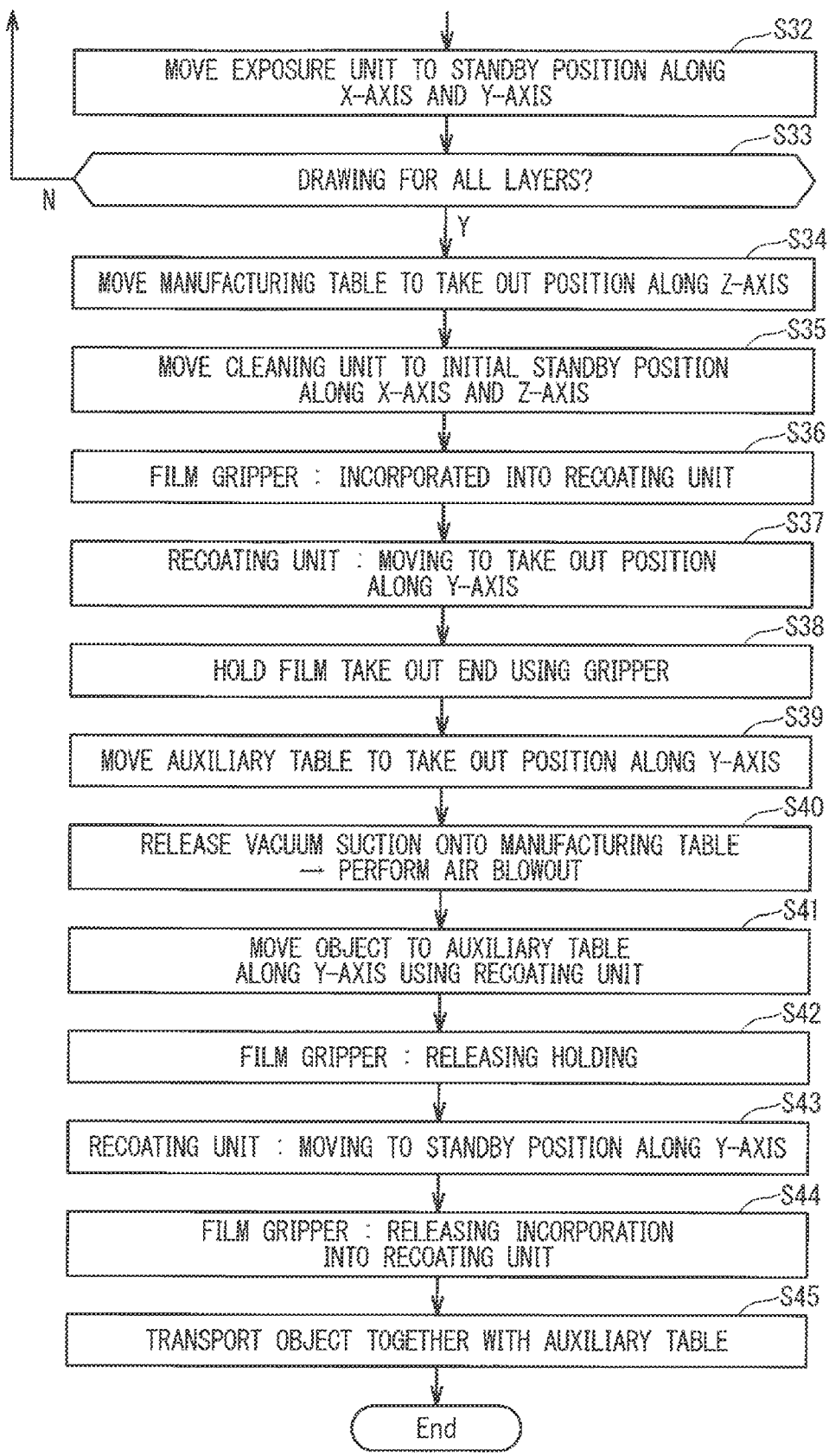
FIG. 6 is a flowchart showing a series of operations of the stereolithography apparatus 1.

FIGS. 4 to 6 are flowcharts showing a series of operations of the stereolithography apparatus 1 when the stereolithography apparatus 1 forms the object. FIGS. 7 to 21 are side views each schematically showing the stereolithography apparatus 1 on the way of manufacturing process.

First, each component and each unit are moved to initial positions (standby positions) (step S1). Specifically, the manufacturing table 11, the auxiliary table 12, the exposure unit 20, and the recoating unit 30 are arranged at the initial positions.

Figure 7:
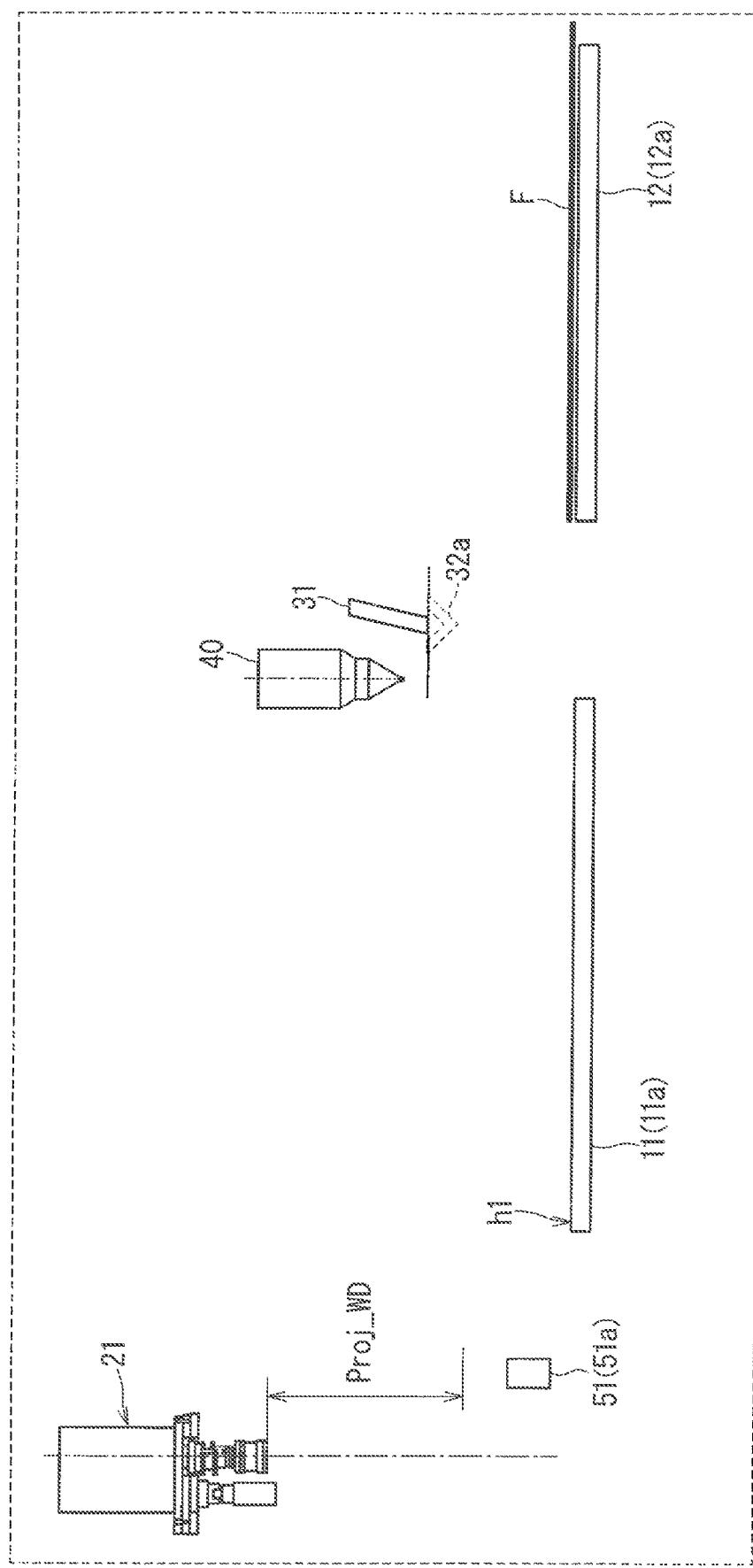
FIG. 7 is a side view schematically showing the stereolithography apparatus 1 on the way of manufacturing process.
Figure 8:
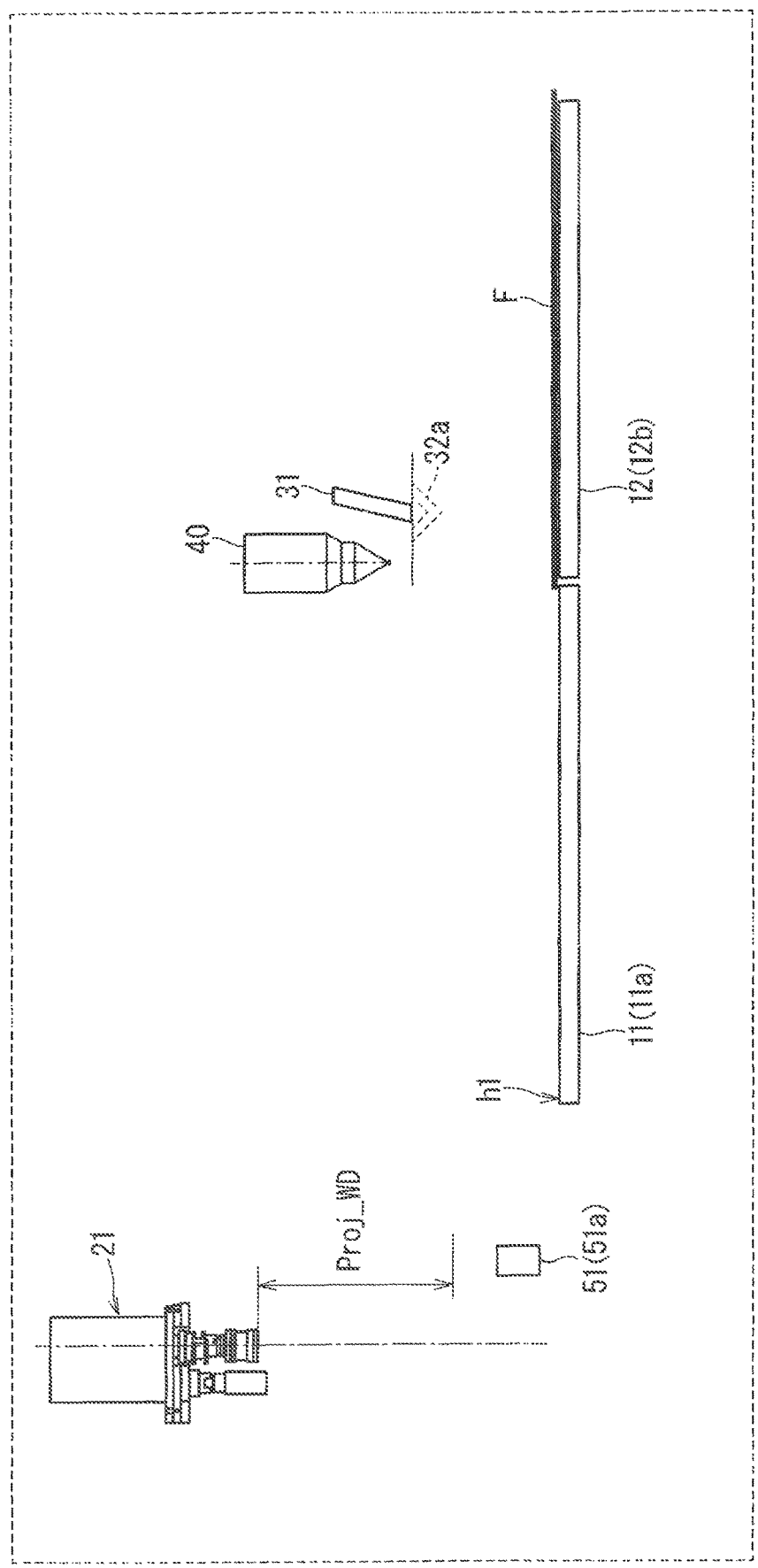
FIG. 8 is a side view schematically showing the stereolithography apparatus 1 on the way of manufacturing process.

Then, as illustrated in FIG. 7, an operator manually mounts (loads) a film F (a protective sheet or also simply referred to as a sheet) on the auxiliary table 12 (step S2). The film F is mounted to cover the entire surface of the auxiliary table 12. The air suction/blowout mechanism 11AR applies a negative pressure to the plurality of suction grooves 12g so that the mounted film F is vacuum-sucked onto the auxiliary table 12. The auxiliary table 12 on which the film F has been mounted is moved from the normal position 12a to the adjacent position 12b as illustrated in FIG. 8.

When the film F is set, the suction pad unit 51 is incorporated into the exposure unit 20 by pin fitting (step S3). In this case, air is supplied from the exposure unit 20 to the air cylinder 51AS by joint connection.

Figure 9:
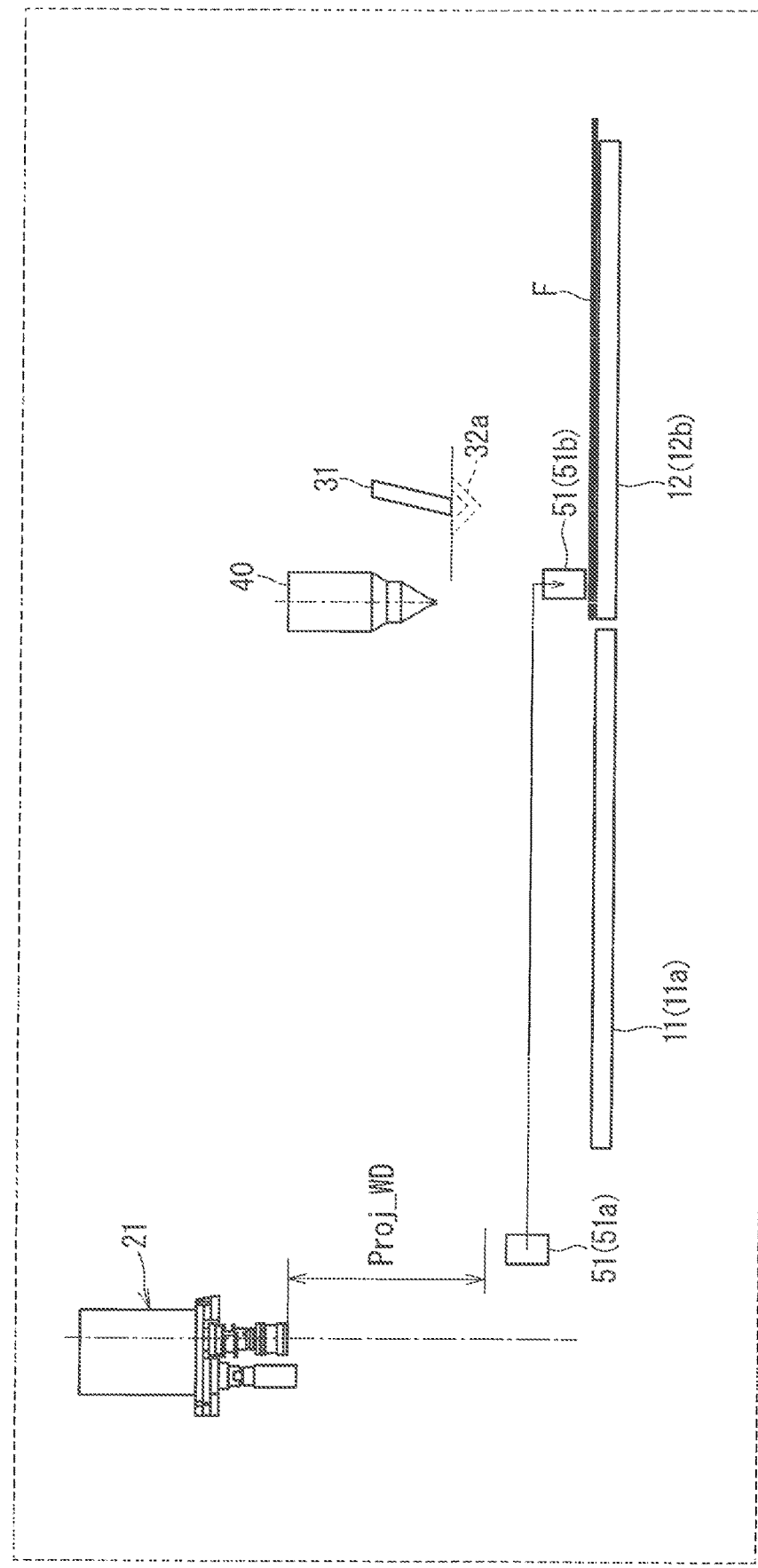
FIG. 9 is a side view schematically showing the stereolithography apparatus 1 on the way of manufacturing process.

Then, the exposure unit 20 moves in the negative y-axis direction, so that the suction pad unit 51 moves to the suction position 51b (step S4). The suction pad unit 51 is lowered by being driven by the air cylinder AS and sucks the film F as illustrated in FIG. 9 (step S5). With suction, vacuum suction of the film F onto the auxiliary table 12 is released.

Figure 10:
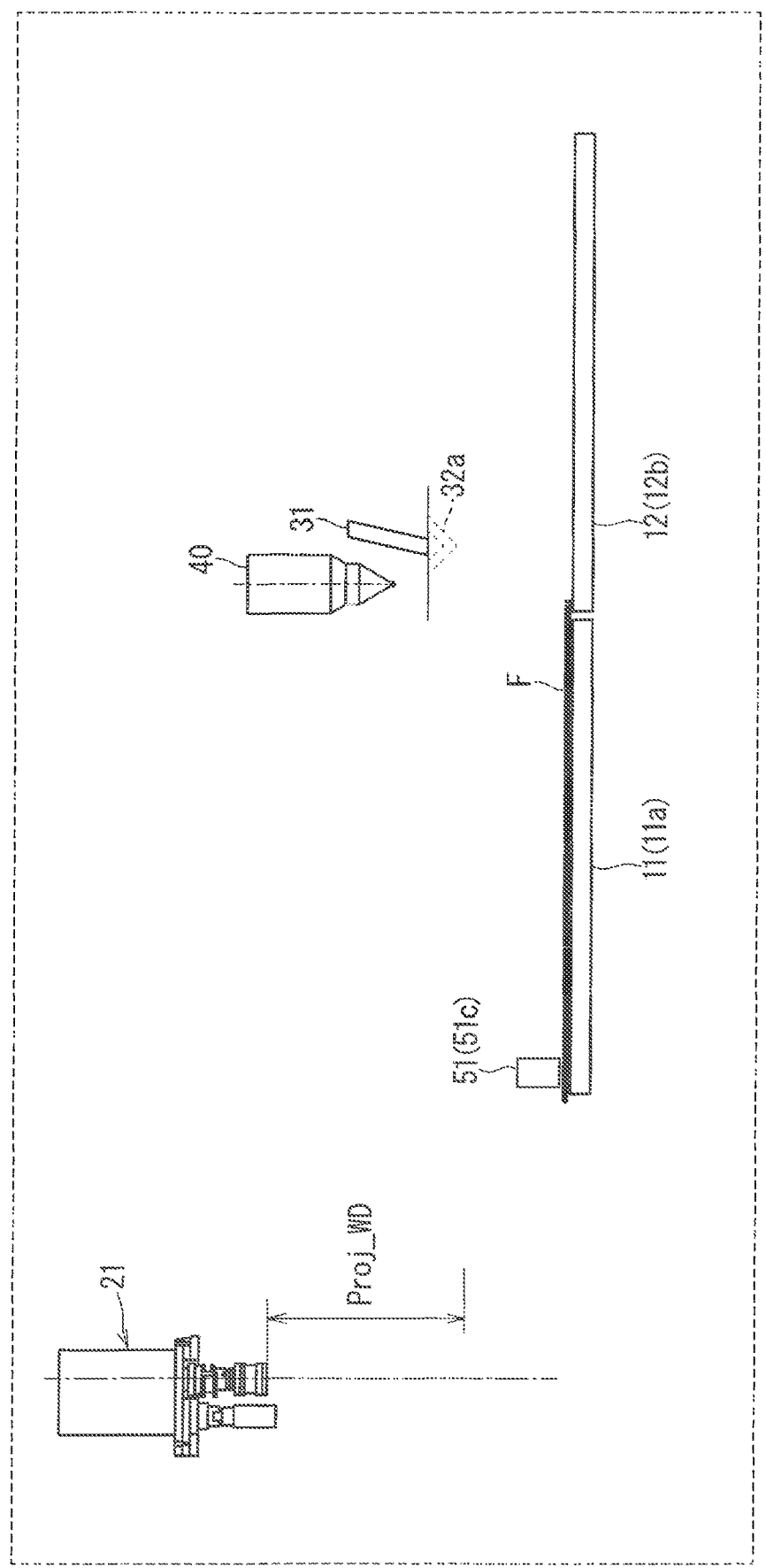
FIG. 10 is a side view schematically showing the stereolithography apparatus 1 on the way of manufacturing process.

The exposure unit 20 moves in the positive y-axis direction with the suction pad unit 51 sucking the film F (step S6). The film F is thereby transported onto the manufacturing table 11 as illustrated in FIG. 10. The exposure unit 20 stops at a time point when the suction pad unit 51 has moved to the termination position 51c and the film F covers the manufacturing table 11 as a whole.

Simultaneously with the stop, the air suction/blowout mechanism 11AR applies a negative pressure to the plurality of suction grooves 11g, so that the film F is vacuum-sucked onto the manufacturing table 11 (step S7). On the other hand, suction by the suction pad unit 51 is released (step S8).

Figure 11:
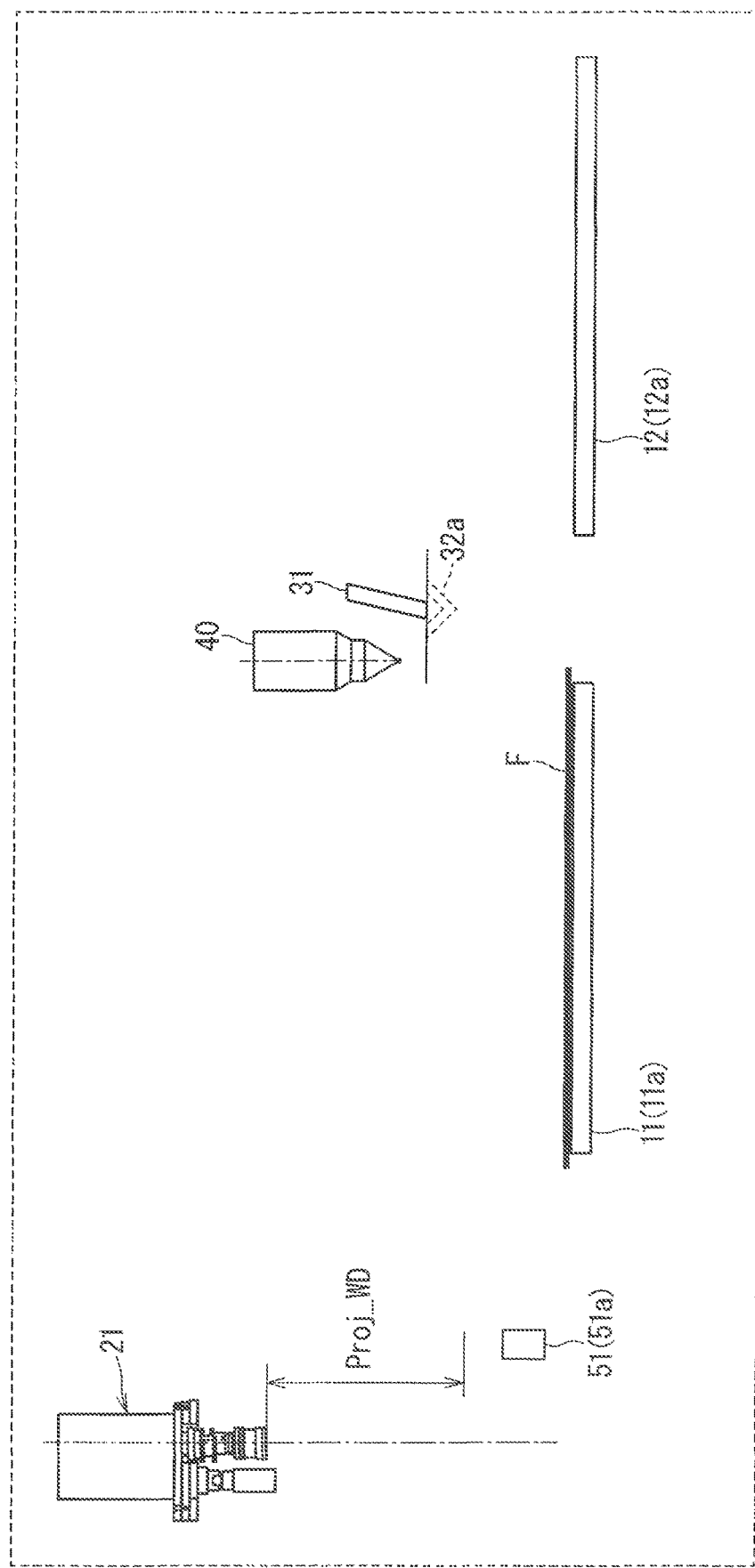
FIG. 11 is a side view schematically showing the stereolithography apparatus 1 on the way of manufacturing process.

Then, the exposure unit 20 is moved to the standby position, and pin fitting is released to separate the suction pad unit 51 from the exposure unit 20 (step S9). In addition, as illustrated in FIG. 11, the auxiliary table 12 at the adjacent position 12b is moved to the normal position 12a (step S10). Alternatively, the operator may directly mount the film F on the manufacturing table 11.

Next, the manufacturing data processing unit C1 generates strip data from the three-dimensional shape data (CAD data) of the manufacturing target (step S11) and further generates the projection (exposure) pattern data based on the strip data (step S12). The strip data is herein partial data of the three-dimensional shape data corresponding to a region in which the projector 21 performs exposure by one movement in the y-axis direction.

The generated projection (exposure) pattern data is transferred to the projector 21 (step S13). Slurry application processing is performed in parallel during transfer (NO in step S14).

Specifically, movement of the auxiliary table 12 to the normal position 12a (step S10) is followed by a raise of the manufacturing table 11 onto which the film F is sucked and fixed to the dispensing/exposure position 11b at the height h2 (step S15).

Figure 12:
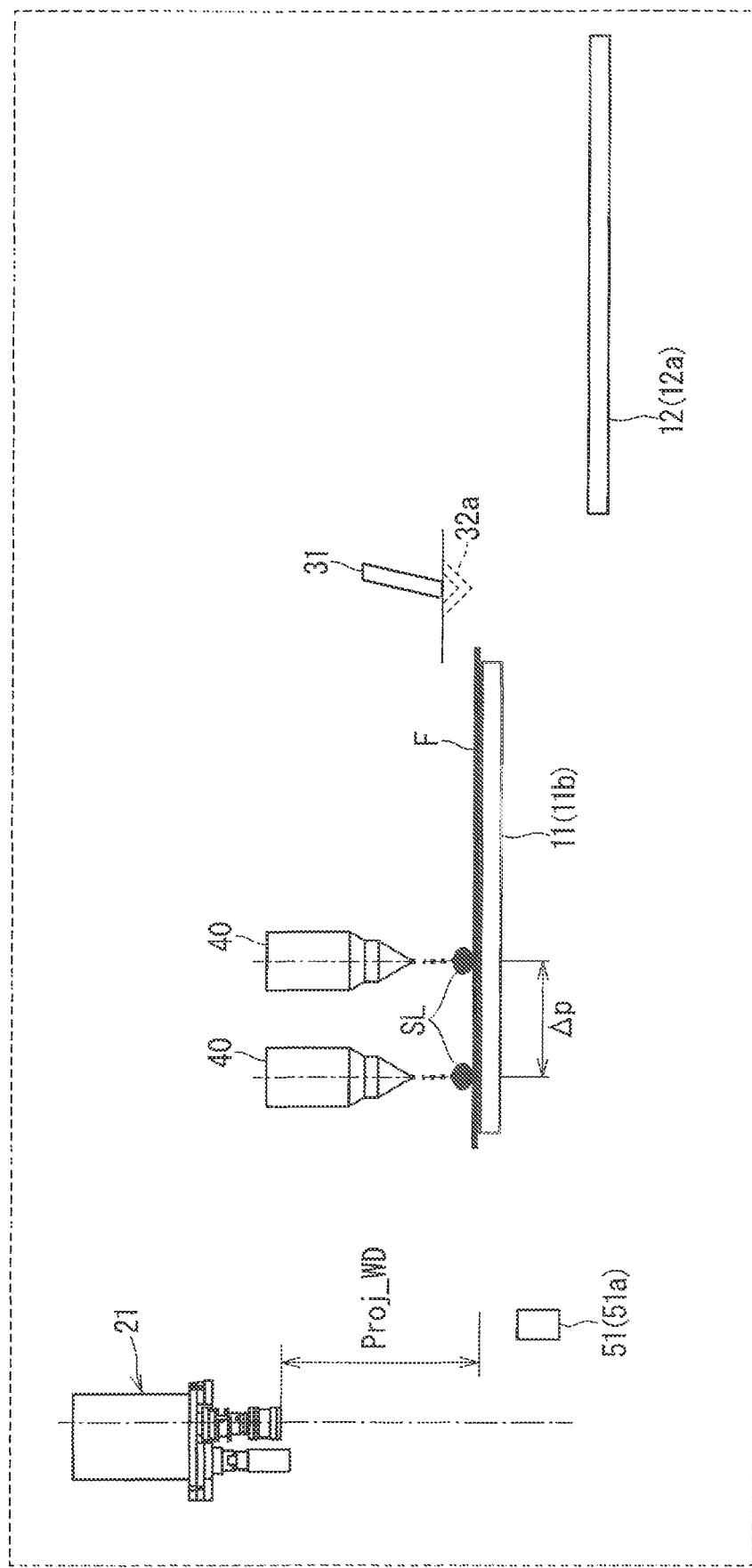
FIG. 12 is a side view schematically showing the stereolithography apparatus 1 on the way of manufacturing process.

Then, the recoating unit 30 moves in the positive y-axis direction, so that the slurry dispensing pump 40 is moved to a predetermined slurry dispensing position. The slurry dispensing position may be set as appropriate according to the size and the area of the manufacturing target and is typically set on the far side in the y-axis direction of the manufacturing table 11 as illustrated in FIG. 12. At the slurry dispensing position, the screw 42 is rotated at a necessary rotational speed while the slurry dispensing pump 40 moves in the x-axis direction with a dispensing port 44 at the lower end thereof being open, so that a predetermined amount of slurry is dispensed onto the manufacturing table 11 in a line (step S16).

Not one pair of a dispensing start point and a dispensing end point but a plurality of pairs of dispensing start points and dispensing end points may be set at appropriate intervals $\Delta p$ in the y-axis direction. Such dispensing of the slurry is referred to as multiline dispensing. Dispensing operation is performed until all the necessary amount of slurry is dispensed (step S17). In a case where multiline dispensing is performed, a distance between the lower end of the slurry dispensing pump 40 and a lower end of the recoater 31 is suitably set so that a leading end of the recoater 31 is not in contact with the dispensed slurry.

Upon completion of dispensing of the slurry (YES in step S17), the dispensing port 44 is put into a closed state by a shutter and the like, and then the recoating unit 30 moves to a recoating start position (step S18). Following movement of the recoating unit 30, the manufacturing table 11 is raised from the dispensing/exposure position 11b to the recoating position 11c (step S19). In this case, a distance between the recoating position 11c and the lower end of the recoater 31 is an application height h5 according to a thickness of a slurry film SLF to be formed. The recoating start position is typically set so that the recoater 31 is located further on a side in the positive y-axis direction than a slurry dispensing range.

Figure 13:
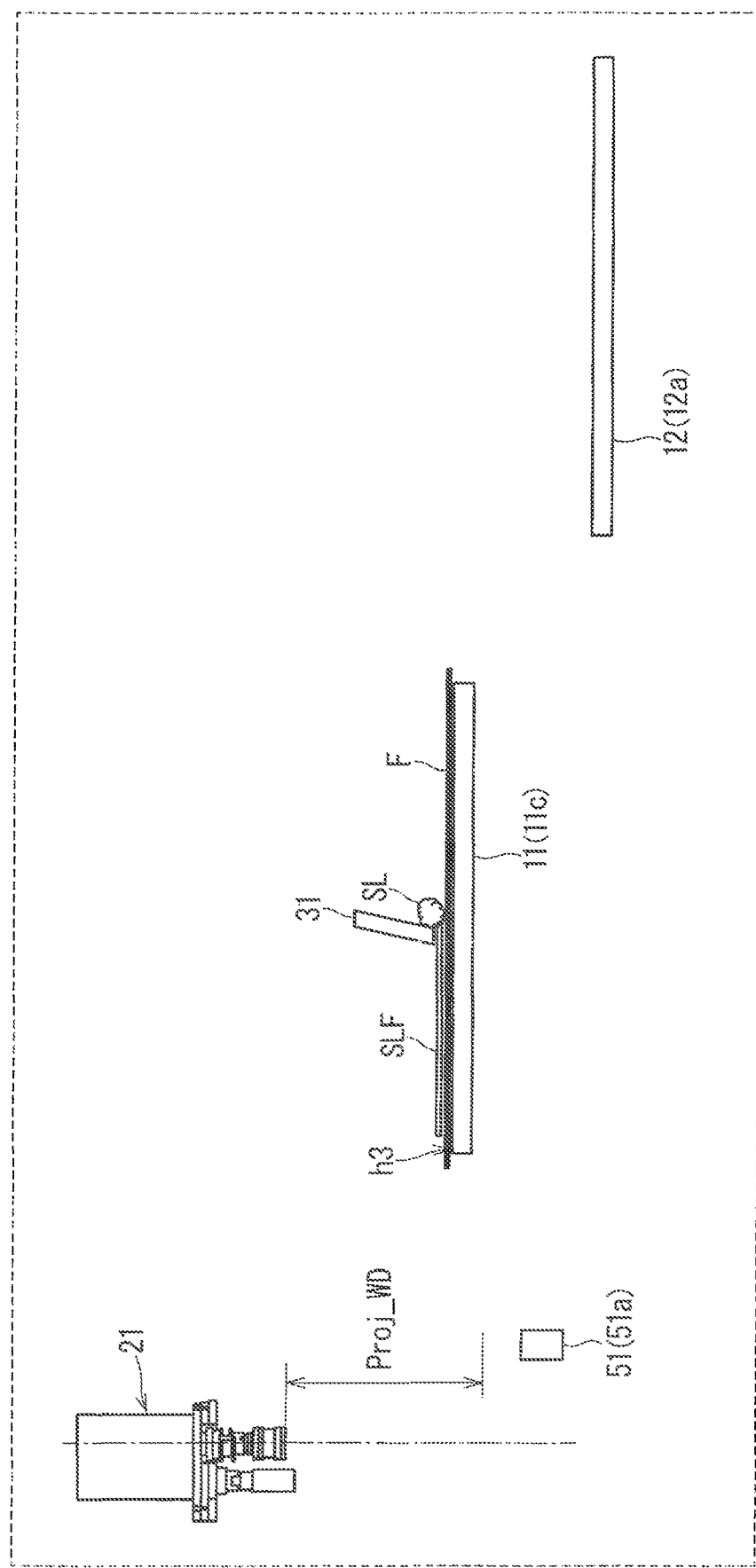
FIG. 13 is a side view schematically showing the stereolithography apparatus 1 on the way of manufacturing process.

When the manufacturing table 11 reaches the recoating position 11c, the recoating unit 30 moves in the negative y-axis direction. The slurry dispensed onto the manufacturing table 11 is thus swept by the recoater 31, and the slurry film SLF having a predetermined thickness is formed as illustrated in FIG. 13 (step S20).

When the recoater 31 moves a predetermined distance in the y-axis direction to form the slurry film SLF in a predetermined range of the manufacturing table 11, the recoating unit 30 further moves in the negative y-axis direction and returns to the standby position (a recoater cleaning position) (step S21, NO in step S22).

Figure 14:
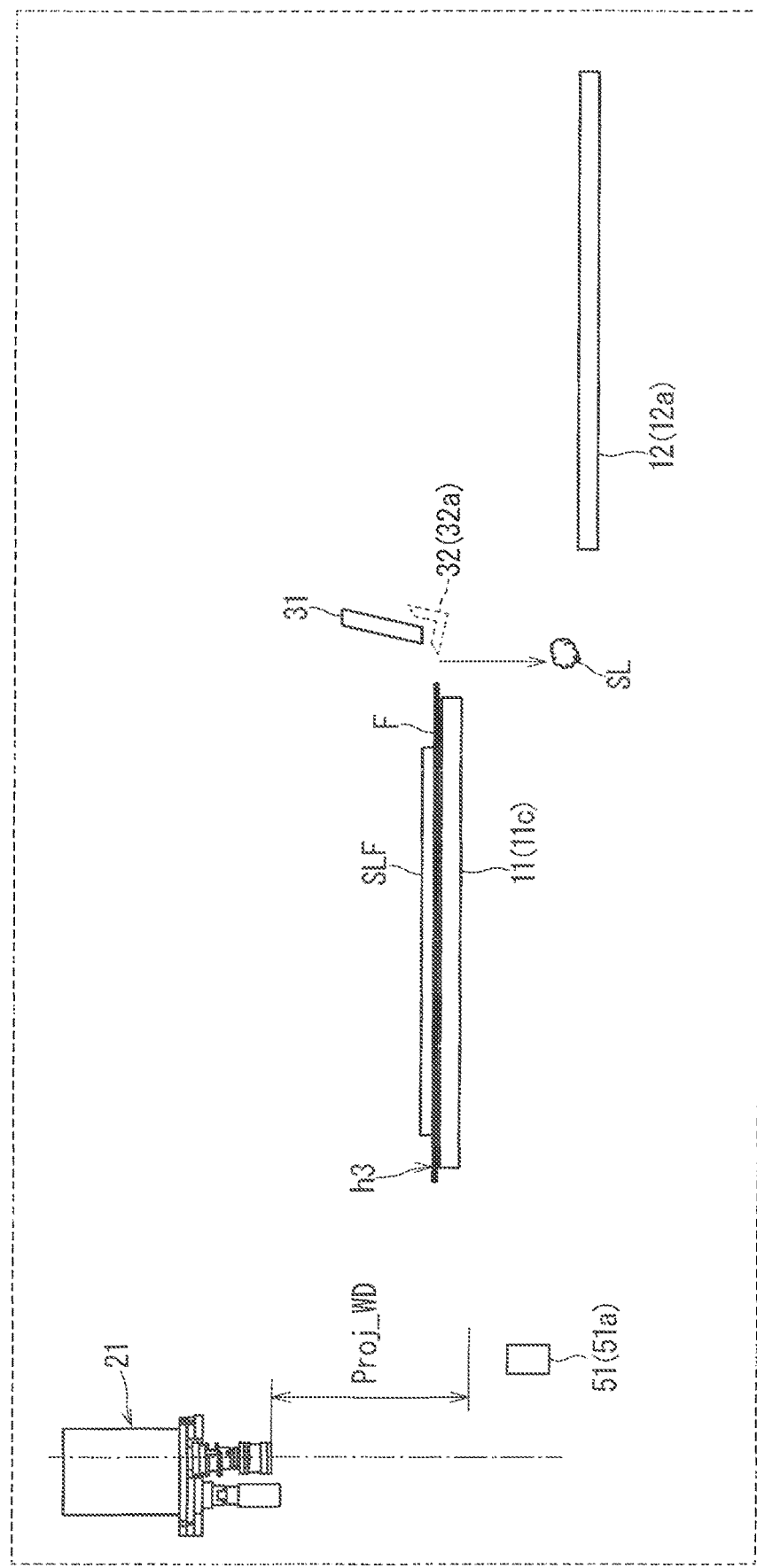
FIG. 14 is a side view schematically showing the stereolithography apparatus 1 on the way of manufacturing process.

When the recoating unit 30 reaches the standby position (recoater cleaning position) (YES in step S22), the cleaning unit 32 having waited at the standby height 32c so far is raised to a cleaning position (the use height 32a) as illustrated in FIG. 14 (step S23). The cleaning unit 32 performs reciprocating movement in the x-axis direction to thereby scrape the slurry adhering to (remaining on) the recoater 31 (step S24). That is to say, the recoater 31 is cleaned.

After completion of cleaning, the cleaning unit 32 is retracted to an initial position in the x-axis direction (step S25) and is further retracted to the manufacturing standby height 32b (step S26).

On the other hand, after the recoating unit 30 moves to the cleaning position upon completion of formation of the slurry film SLF by the recoater 31 (YES in step S22), pattern exposure by the projector 21 progresses in parallel with cleaning of the recoater 31.

Specifically, the manufacturing table 11 over which the slurry film SLF is formed is first moved from the recoating position 11c to the dispensing/exposure position 11b (step S28). Then, the exposure unit 20 is disposed at an exposure start position (step S29). More specifically, the exposure unit 20 is moved in the negative y-axis direction, and a position in the x-axis direction of the projector 21 is adjusted.

Figure 15:
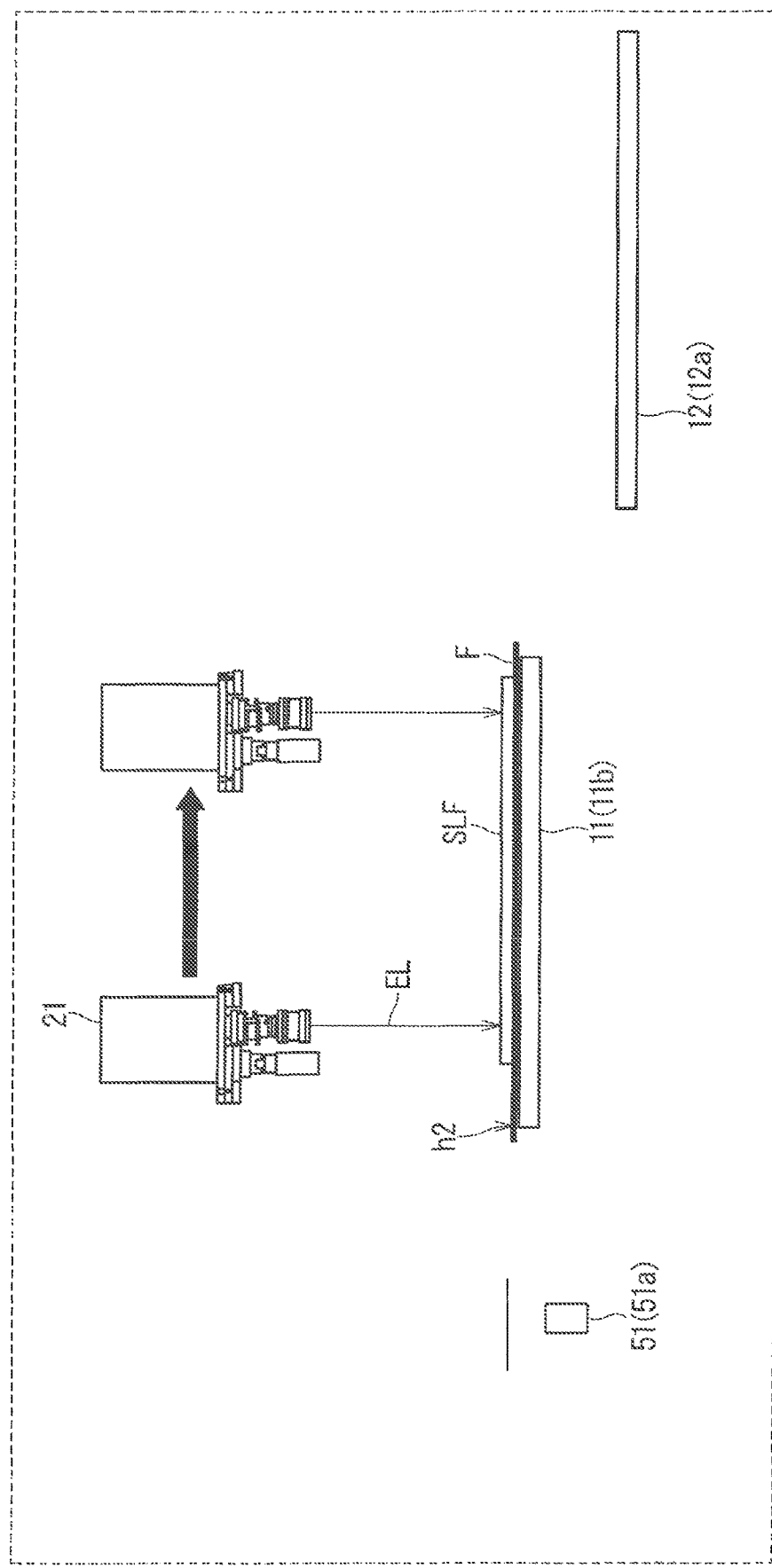
FIG. 15 is a side view schematically showing the stereolithography apparatus 1 on the way of manufacturing process.

When the projector 21 is disposed at a predetermined exposure start position, the slurry film SLF is exposed to exposure light EL emitted from the projector 21 in units of strips as illustrated in FIG. 15 by a combination of continuous reciprocating movement in the y-axis direction of the exposure unit 20 and step movement in the x-axis direction of the projector 21 based on the exposure pattern data transferred in advance (step S30).

More specifically, in a case where an exposure (a drawing) target strip still remains (NO in step S31) at a time point when exposure for one strip is completed by one movement in the y-axis direction of the exposure unit 20, generation of strip data (step S11), generation of the exposure pattern data (step S12), and transfer of the exposure pattern data (steps S13 and S14) targeted for a next strip are performed. Then, the projector 21 performs step movement in the x-axis direction, and the exposure unit 20 moves opposite in the y-axis direction from a direction in the most recent drawing to perform exposure based on the newly generated exposure pattern data.

Upon completion of drawing for all the strips (YES in step S31), the exposure unit 20 is retracted to the standby position (step S32). In this case, the projector 21 also moves to the initial position. At a time point until completion of drawing for all the strips, cleaning of the recoater 31 (step S24) is typically completed, and the cleaning unit 32 has moved to the manufacturing standby height 32b (YES in step S27).

Figure 16:
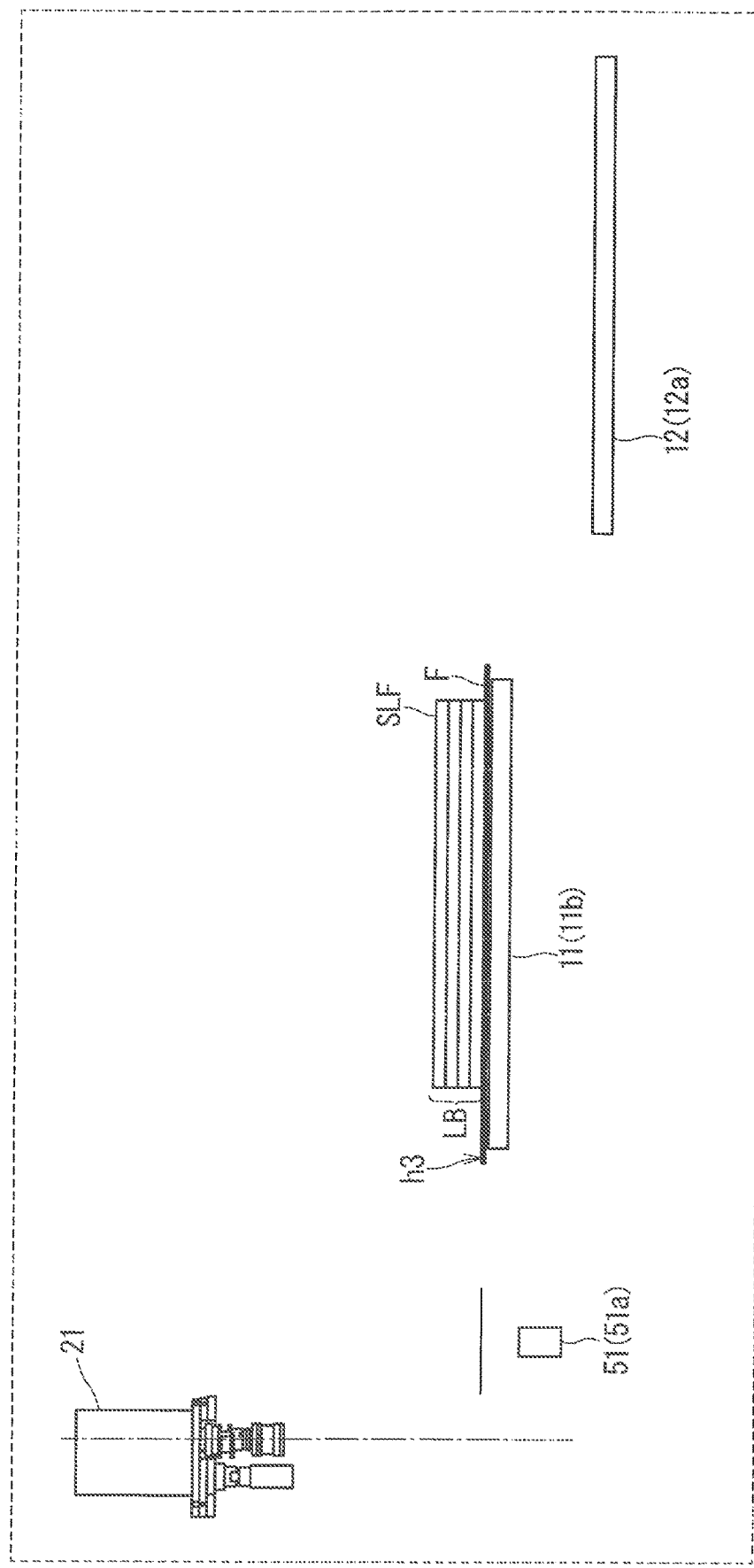
FIG. 16 is a side view schematically showing the stereolithography apparatus 1 on the way of manufacturing process.

In a case where it is necessary to perform drawing for yet another layer (the slurry film SLF) thereafter (NO in step S33), processing in and after step S11 is repeated. That is to say, formation of the slurry film SLF and pattern exposure are repeated. The slurry film SLF subjected to the most recent exposure is formed in this case. FIG. 16 illustrates the completed object (a laminated body LB of slurry films SLF) buried in an unexposed portion due to completion of exposure of all the layers.

Figure 17:
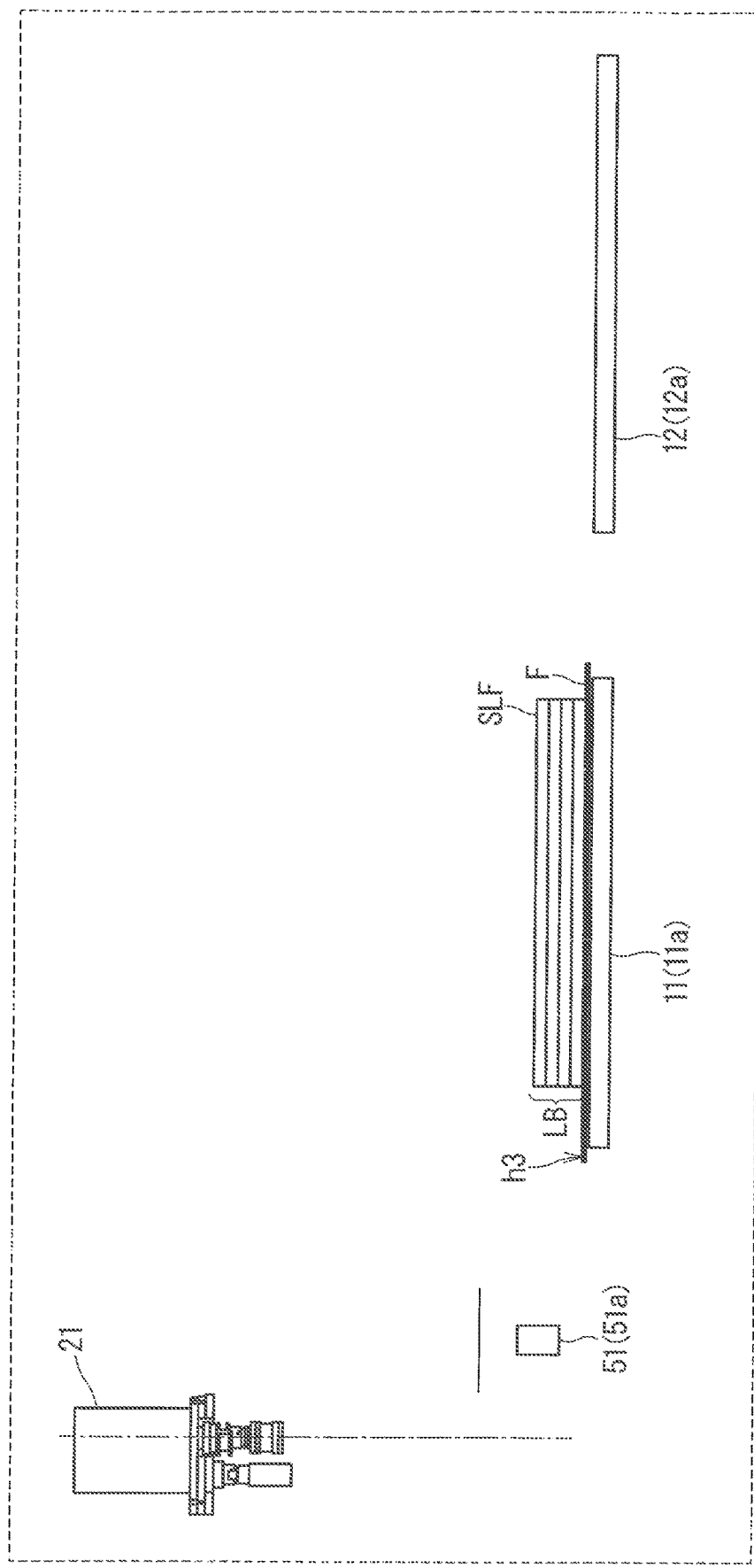
FIG. 17 is a side view schematically showing the stereolithography apparatus 1 on the way of manufacturing process.

Upon completion of the object (YES in step S33), the manufacturing table 11 is lowered to the initial position 11a as illustrated in FIG. 17 to remove the unexposed portion to take out the object (step S34). In addition, the cleaning unit 32 having been located at the manufacturing standby height 32b so far is lowered to the standby height 32c (step S35).

Furthermore, the film gripper 52 located at the standby position 52a is incorporated into the recoating unit 30 by pin fitting (step S36). Then, the recoating unit 30 moves in the positive y-axis direction to dispose the film gripper 52 at the holding position 52b at the opposite ends in the negative y-axis direction of the manufacturing table 11 (step S37). The film gripper 52 holds ends of the film F laid under the object on the manufacturing table 11 at the position (step S38).

On the other hand, the auxiliary table 12 waiting at the normal position 12a is moved to the adjacent position 12b in parallel with holding (step S39). The manufacturing table 11 over which the object and the film F are mounted and the auxiliary table 12 are thus flush with each other. In this state, vacuum suction of the film F onto the manufacturing table 11 due to application of the negative pressure by the air suction/blowout mechanism 11AR is released, and the air suction/blowout mechanism 11AR sequentially and selectively supplies air to suction grooves 11g and further suction grooves 12g in zones necessary to float the object instead (step S40).

Figure 18:
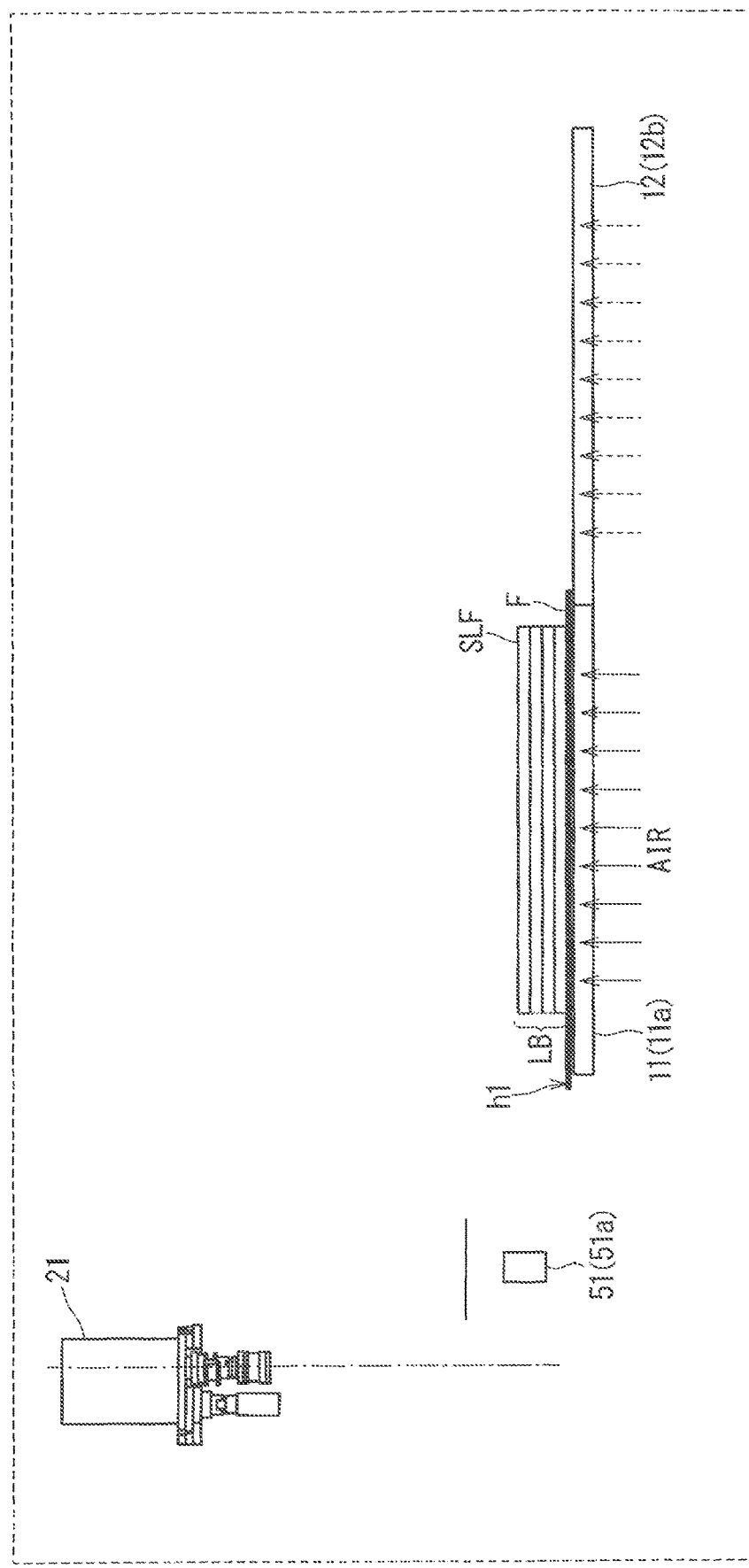
FIG. 18 is a side view schematically showing the stereolithography apparatus 1 on the way of manufacturing process.

FIG. 18 illustrates the supply of air. The air suction/blowout mechanism 11AR first supplies air to suction grooves 11g in zones corresponding to the position of the object under control performed by the controller C. Upon start of the supply of air, a back surface of the film F having been in contact with the manufacturing table 11 so far receives an upward force due to air, and all or part of the film F is slightly floated together with the object. All or part of the film F and the object thus become out of contact with the manufacturing table 11 to facilitate transport due to application of a force in a horizontal direction. In an example of FIG. 18, air blowout from suction grooves 12g of the auxiliary table 12 that the object has yet to reach is stopped.

The recoating unit 30 moves at a timing when the out-of-contact state is achieved, so that the film gripper 52 moves in the negative y-axis direction toward to the standby position 52a. The film gripper 52 holds the film F floated by air, so that, with movement of the film gripper 52, the film F and the object thereon move from a position above the manufacturing table 11 to a position above the auxiliary table 12 (step S41).

Figure 19:
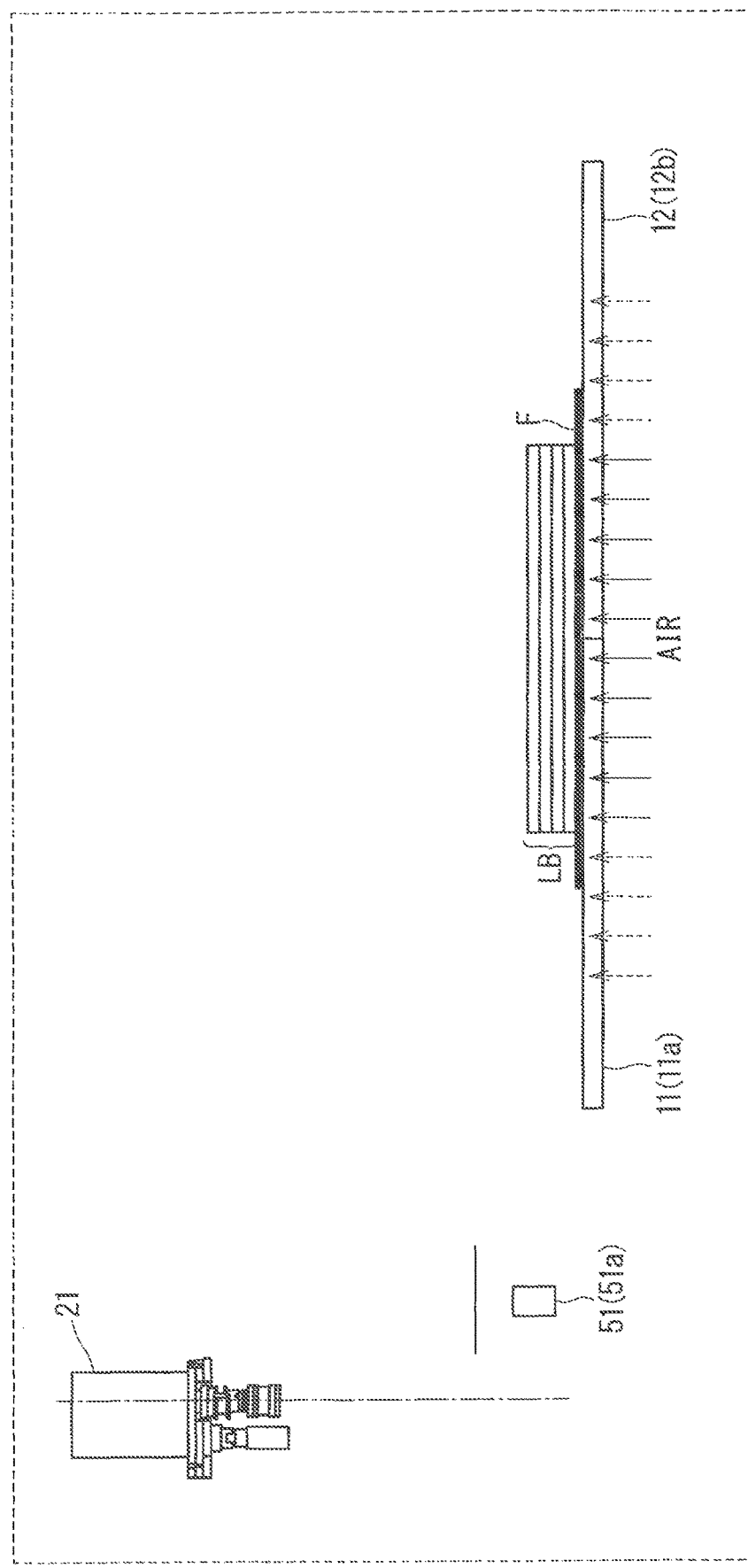
FIG. 19 is a side view schematically showing the stereolithography apparatus 1 on the way of manufacturing process.
Figure 20:
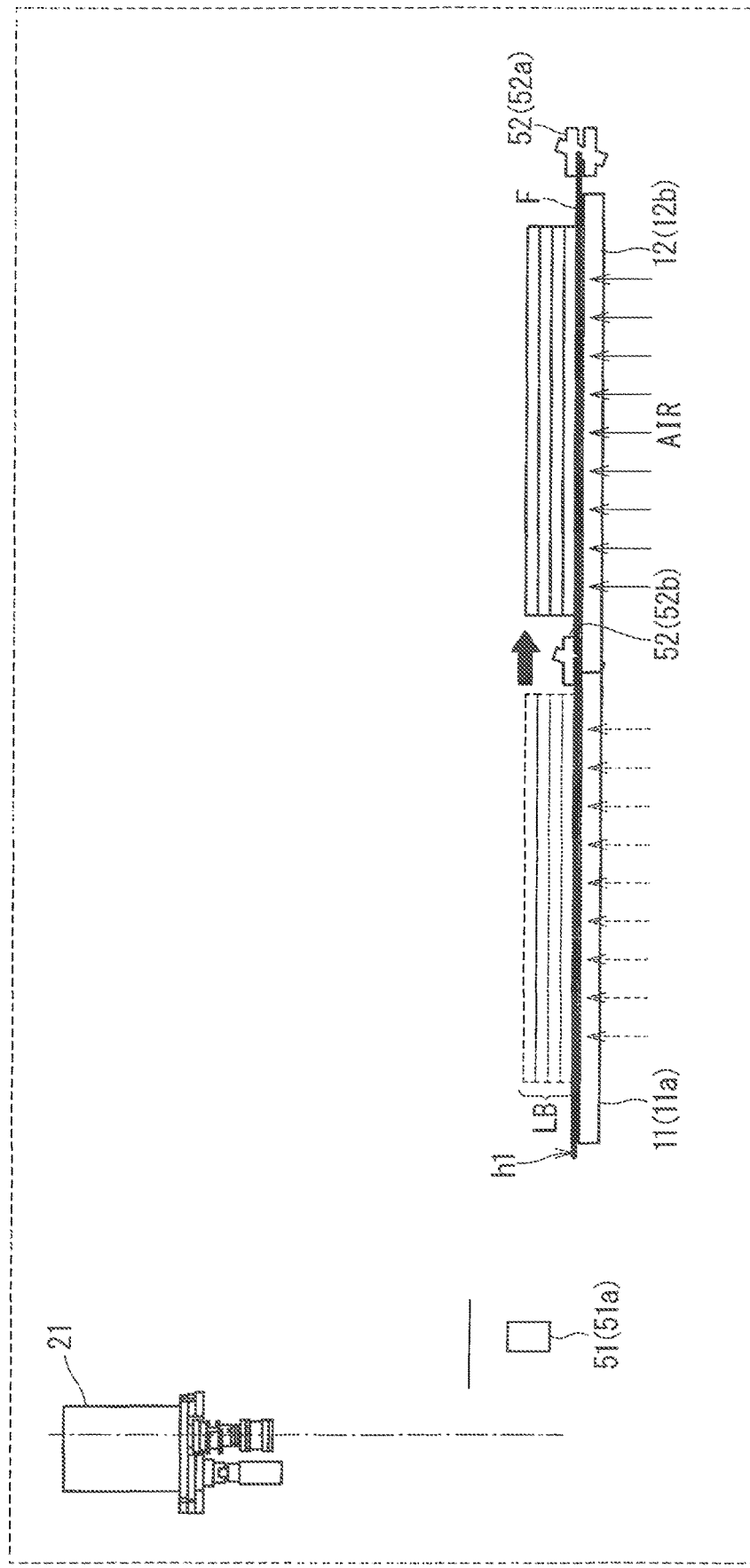
FIG. 20 is a side view schematically showing the stereolithography apparatus 1 on the way of manufacturing process.

FIGS. 19 and 20 illustrate movement. As illustrated in FIG. 19, when the object mounted on the film F is transported, the controller C causes the air suction/blowout mechanism 11AR to supply air from suction grooves 11g and 12g in zones corresponding to the position of the object and stop air supply from suction grooves 11g and 12g out of the zones. The object is thereby transported while being floated from the manufacturing table 11 and the auxiliary table 12 together with part or all of the film F as illustrated in FIG. 20.

Upon completion of movement of the film F and the object to the auxiliary table 12, holding of the film F by the film gripper 52 is released (step S42). Then, the recoating unit 30 into which the film gripper 52 is incorporated is moved in the y-axis direction and returned to the standby position (step S43), and incorporation of the film gripper 52 into the recoating unit 30 is released (step S44).

Figure 21:
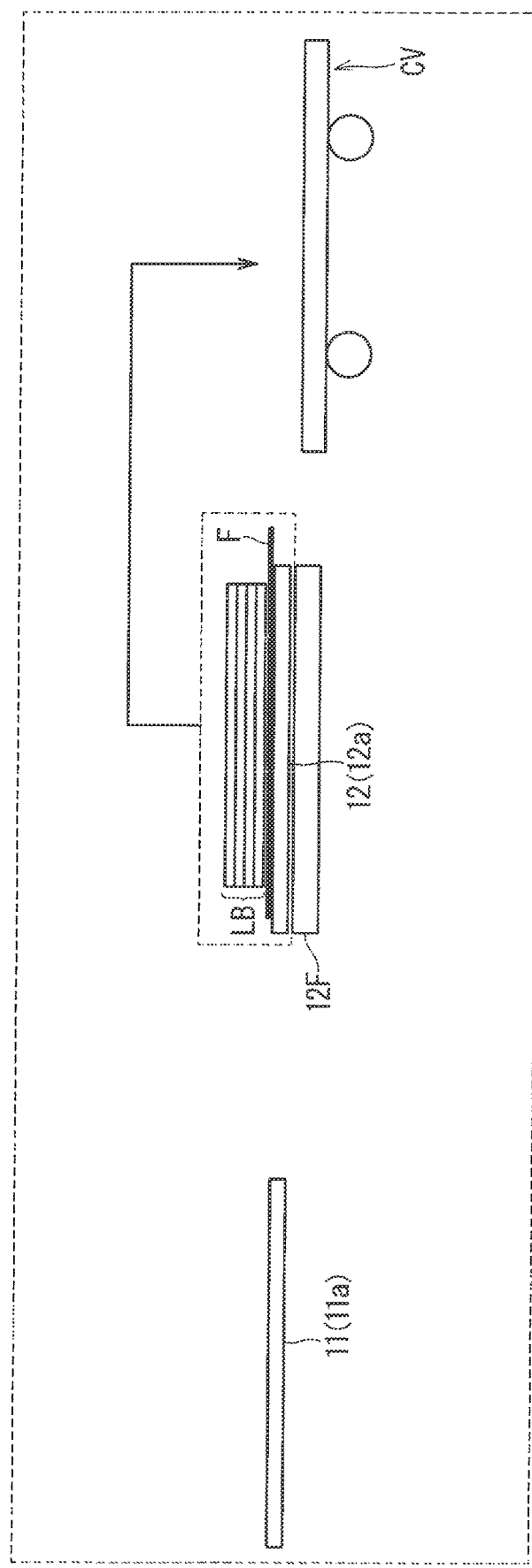
FIG. 21 is a side view schematically showing the stereolithography apparatus 1 on the way of manufacturing process.

Furthermore, the auxiliary table 12 over which the object is mounted together with the film F is returned from the adjacent position 12b to the normal position 12a. The auxiliary table 12 is removable from the fixing part 12F at the normal position 12a, and the operator removes the auxiliary table 12 from the fixing part, transfers the object together with the auxiliary table 12 to a transport mount CV prepared in advance, and transports them to an outside of the stereolithography apparatus 1 as illustrated in FIG. 21 (step S45). This allows for transport without direct contact with the object, enabling reduction in risk of breakage and the like and stable transport.

The foregoing is description of procedures for formation and taking out thereafter of the object achieved by the stereolithography apparatus 1 according to the present embodiment. The stereolithography apparatus 1 according to the present embodiment is particularly characterized in that, even in a case where an object having a large size is formed, the object is easily and surely taken out.

Specifically, air can be supplied to the plurality of suction grooves for vacuum suction provided in the surface of the manufacturing table 11 for manufacturing. The auxiliary table 12 is provided as a port to take out the object separately from the manufacturing table 11, and air can be supplied in the auxiliary table 12 as in the manufacturing table 11. Even when an object has a large size and a large area, the object can be floated by air to be out of contact with the manufacturing table 11 and the auxiliary table 12 to facilitate horizontal transport (transfer) of the object while the film laid under the object is held.

In addition, the auxiliary table 12 is provided to be removable from the fixing part 12F. In other words, the auxiliary table 12 itself is portable. The object transferred from the manufacturing table 11 can thus be transported to the outside together with the auxiliary table 12. This allows for transport without contact with the object, enabling stable transport with a reduced risk of breakage and the like.

<Details of Inclined Exposure>

Figure 22:
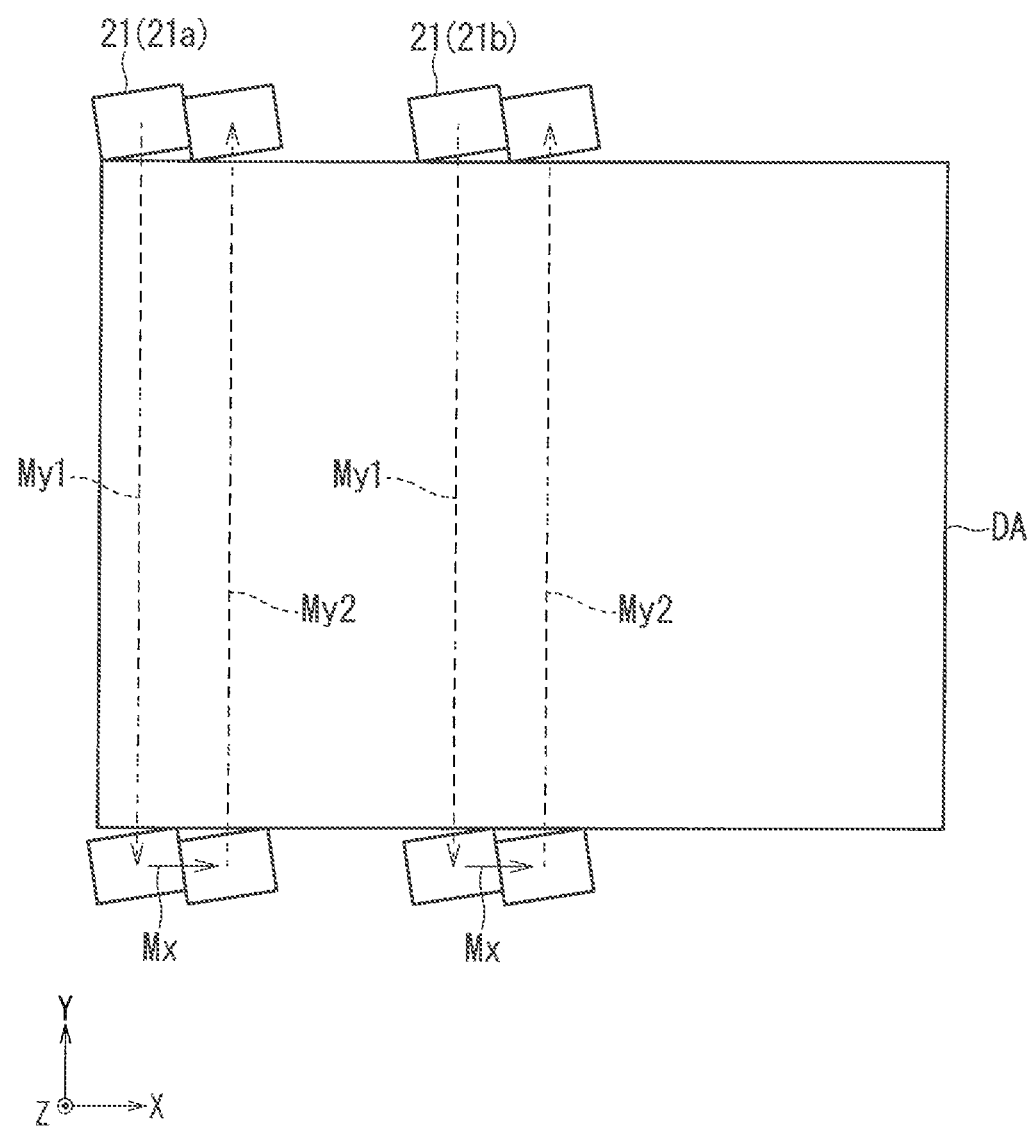
FIG. 22 is a schematic diagram of inclined exposure performed by projectors 21 of the stereolithography apparatus 1.

FIG. 22 is a schematic diagram of inclined exposure performed by projectors 21 of the stereolithography apparatus 1 according to the present embodiment.

First, FIG. 22 illustrates exposure corresponding to a drawing pattern PT that the projectors 21 perform at certain positions under control performed by the controller C.

As described above, in the stereolithography apparatus 1 according to the present embodiment, the projection (exposure) pattern (data) is fed while the projectors 21 arranged to be slightly inclined with respect to the y-axis direction are moved in steps or continuously in the y-axis direction to project the pattern. In practice, the exposure unit 20 includes the four projectors 21 (21a to 21d) provided at regular intervals in the x-axis direction, and the four projectors 21a to 21d perform exposure simultaneously. FIG. 22 illustrates operation of the projectors 21a and 21b as some of them. That is to say, the four projectors 21 alternate stepped or continuous movement My1 in the negative y-axis direction and movement My2 in the positive y-axis direction between an end in the positive y-axis direction and an end in the negative y-axis direction of the drawing area DA with intervening step movement Mx in a positive x-axis direction, and perform projection (drawing) according to the projection (exposure) pattern during the movement My1 and the movement My2.

Figure 23:
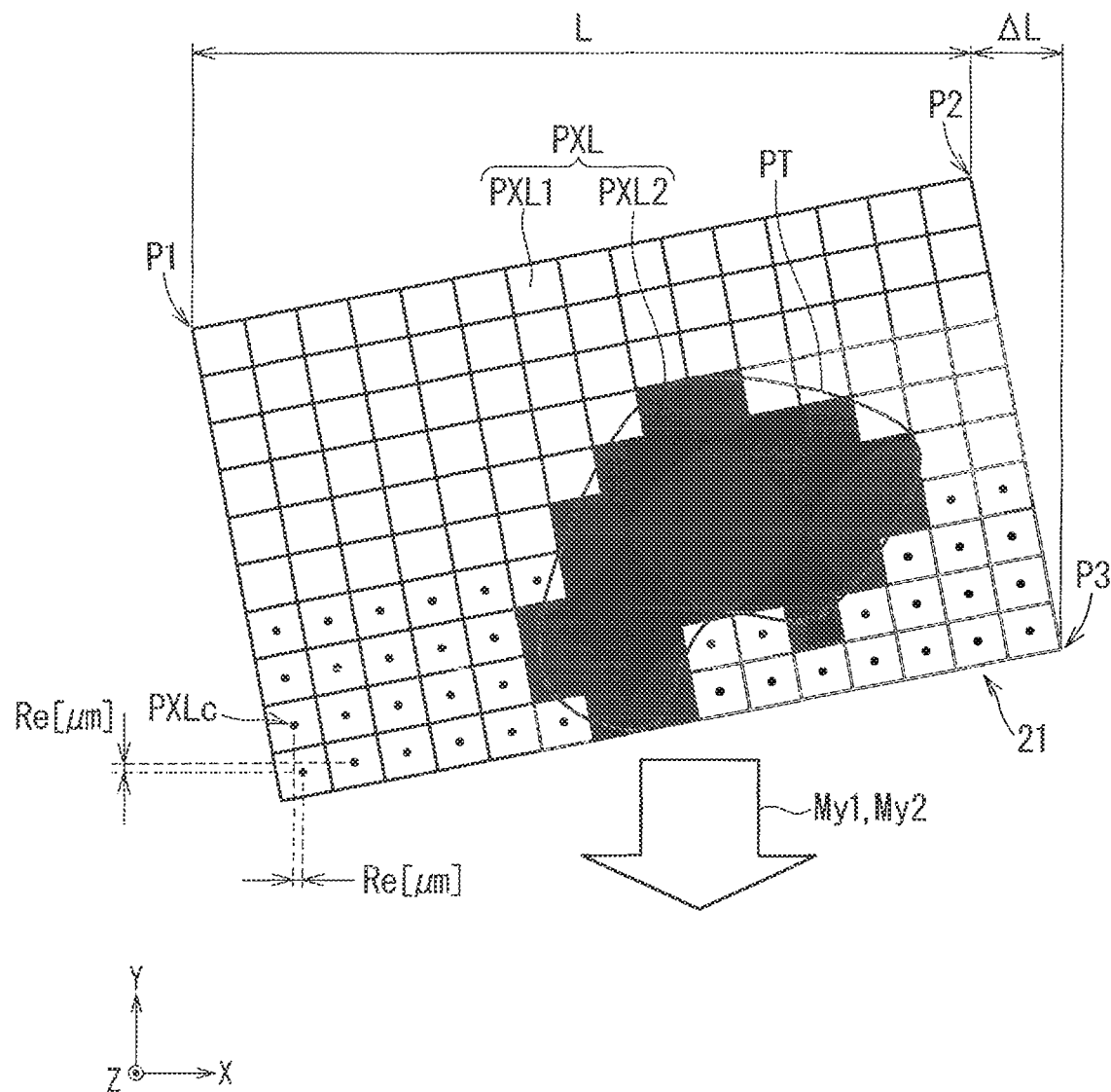
FIG. 23 is a diagram for explaining a pixel arrangement and an inclination of a projector 21.
Figure 24:
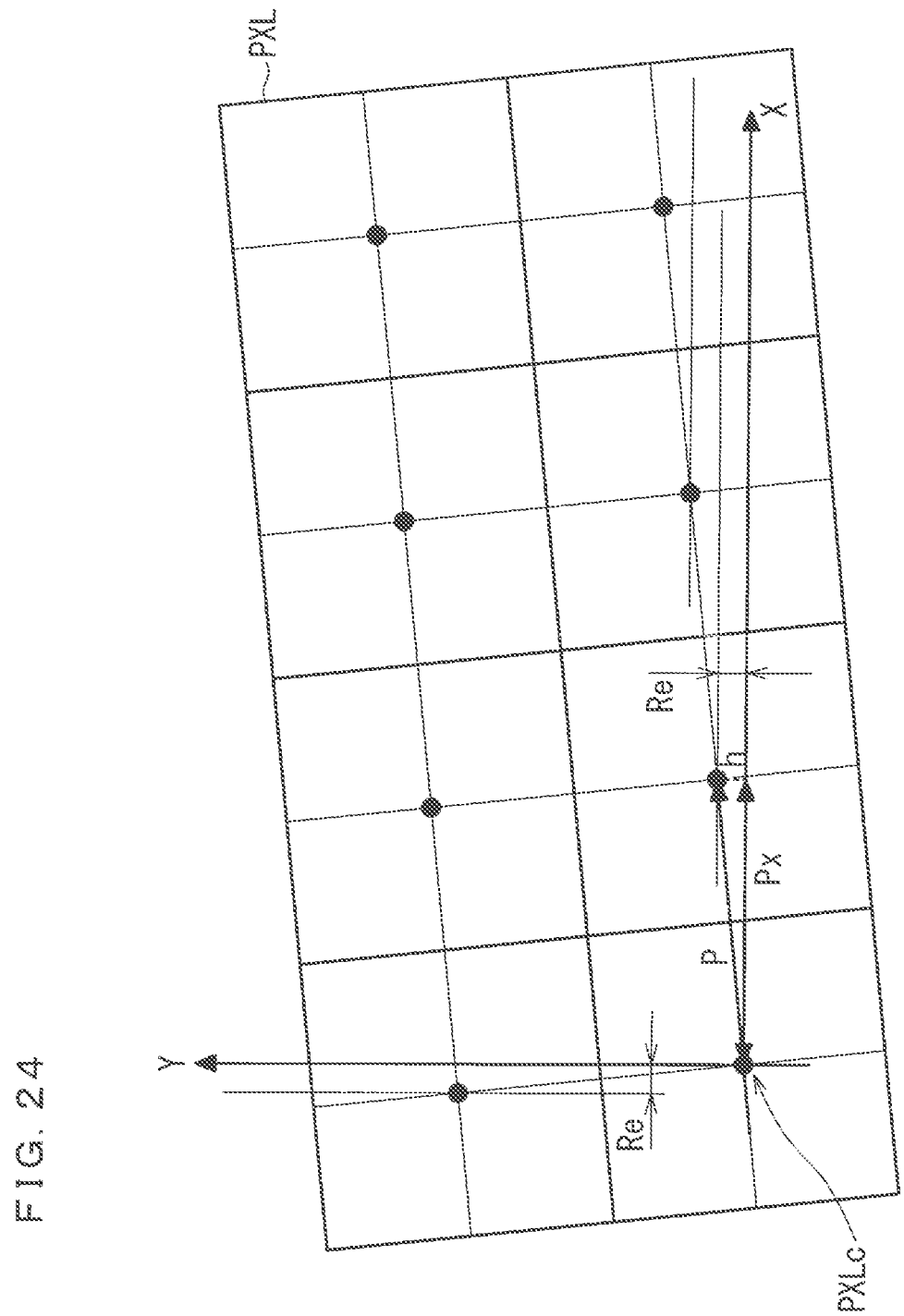
FIG. 24 is a diagram for explaining the pixel arrangement and the inclination of the projector 21.

FIGS. 23 and 24 are diagrams each for explaining a pixel arrangement and an inclination of a projector 21. The projector 21 has a configuration in which a plurality of pixels PXL are in a two-dimensional (e.g., rectangular) arrangement, and ON-OFF states of exposure light at the respective pixels PXL can individually be switched under control performed by the controller C according to the exposure pattern data. Pixels PXL1 in ON states and pixels PXL2 in OFF states are distinguished from each other in FIG. 23.

The projector 21 is disposed to be inclined with respect to the y-axis direction as a movement direction. Specifically, in an arrangement of pixels PXL in the y-axis direction (a vertical direction in the figure) (actually slightly inclined), the projector 21 is disposed in the exposure unit 20 to be inclined so that center positions PXLc of adjacent pixels PXL are offset by a drawing pitch Re in the x-axis direction, where Re (μm) is a necessary drawing pitch. Such an inclination results in the drawing pitch Re in the x-axis direction.

In the y-axis direction (a scanning direction) in which the projector 21 performs the movement My1 and the movement My2, exposure is performed while the exposure pattern is switched each time a feed movement of the projector 21 by the distance Re is performed. That is to say, drawing switching (lighting control) is performed for each movement of the distance Re to obtain the drawing pitch Re in the y-axis direction.

More specifically, an equation Px:h=n:1 (n is an integer) preferably holds, where P (μm) is a size of each of the pixels PXL (a pixel pitch), Px (μm) is a projection size of the size in the x-axis direction, and h (μm) is a projection size of the size in the y-axis direction as illustrated in FIG. 24. In a case where the projector 21 includes pixels in a 1920×1080 arrangement, for example, an equation n=24 preferably holds in view of a high flexibility of setting of an exposure condition.

Assume that the drawing pitch Re is smaller than the pixel size P. ON-OFF of exposure at each of the pixels PXL of the projector 21 at a certain position is determined based on whether a center position PXLc thereof is within the drawing pattern PT. For example, FIG. 23 illustrates the pixels PXL1 put into the ON states and the pixels PXL2 put into the OFF states in a case where the projector 21 performs exposure corresponding to the drawing pattern PT.

In the present embodiment, in the projector 21 including the pixels PXL in the rectangular arrangement, a distance in the x-axis direction between a position P1, which is an end in a negative x-axis direction and also in the positive y-axis direction, and a position P2, which is an end in the positive x-axis direction and also in the positive y-axis direction, is referred to as a drawing width L as illustrated in FIG. 23. The drawing width L is a width in the x-axis direction of a strip region extending in the y-axis direction as an exposure region during one movement of the projector 21 in the y-axis direction. Since the projector 21 is inclined in a strict sense, exposure is also performed in a rectangular region having a width ΔL in the x-axis direction between the above-mentioned position P2 and a position P3, which is an end in the positive x-axis direction and also in the negative y-axis direction of the projector 21, while the projector 21 moves in the y-axis direction, but the region is an overlap region (also referred to as the "joint portion") with a strip region in next exposure in the y-axis direction and typically includes at most approximately two to three pixels in the x-axis direction.

Figure 25:
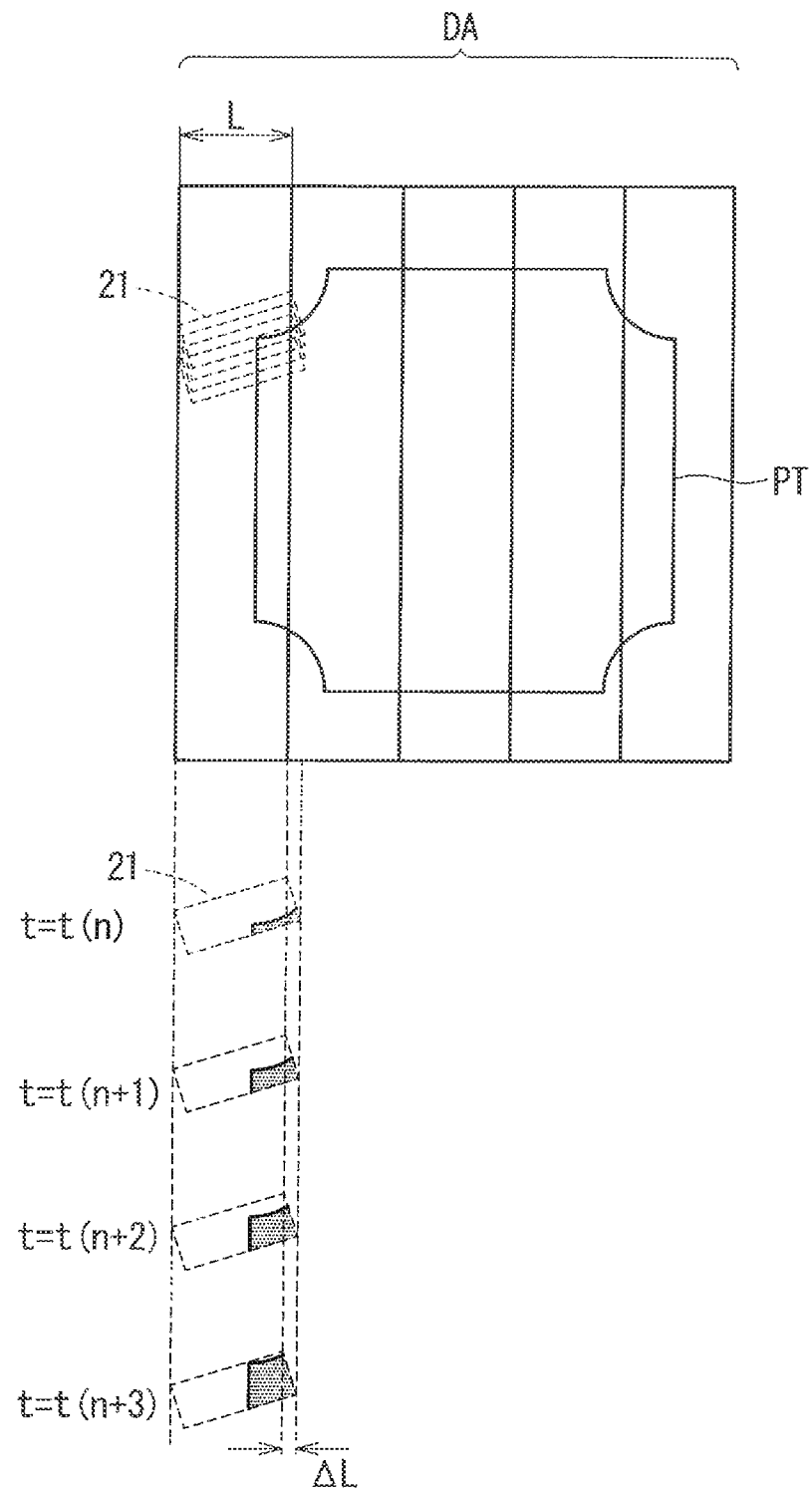
FIG. 25 is a diagram illustrating a change of an exposure pattern when a drawing area DA is exposed for each drawing width L according to a predetermined drawing pattern while the projector 21 moves.

FIG. 25 is a diagram illustrating a change of an exposure pattern when the drawing area DA is exposed for each drawing width L according to a predetermined drawing pattern while the projector 21 moves. The projector 21 performs strip exposure while gradually moving in the y-axis direction. Exposure patterns at arbitrary times t=t(n), t(n+1), t(n+2), and t(n+3) are thus different as illustrated in FIG. 25. When viewed locally, however, different pixels PXL arranged along the y-axis direction of the projector 21 sequentially expose the same position in the drawing area DA with movement of the projector 21, and, as a result, exposure is performed in substantially the same amount of exposure light (accumulated amount of light) at a position in the drawing area DA. The stereolithography apparatus 1 according to the present embodiment performs exposure in this manner and thus can expose the drawing area DA with a high definition while moving the exposure unit 20 at a high speed.

<Shift of Joint Portion of Strip Regions>

As illustrated in FIGS. 23 and 25, the joint portion having the width ΔL is formed in adjacent strip regions when the drawing area DA is exposed for each drawing width L. In the stereolithography apparatus 1 according to the present embodiment that alternates formation (laminating) of the slurry film and exposure to obtain the three-dimensional object, the joint portion is formed in each layer.

Figure 26:
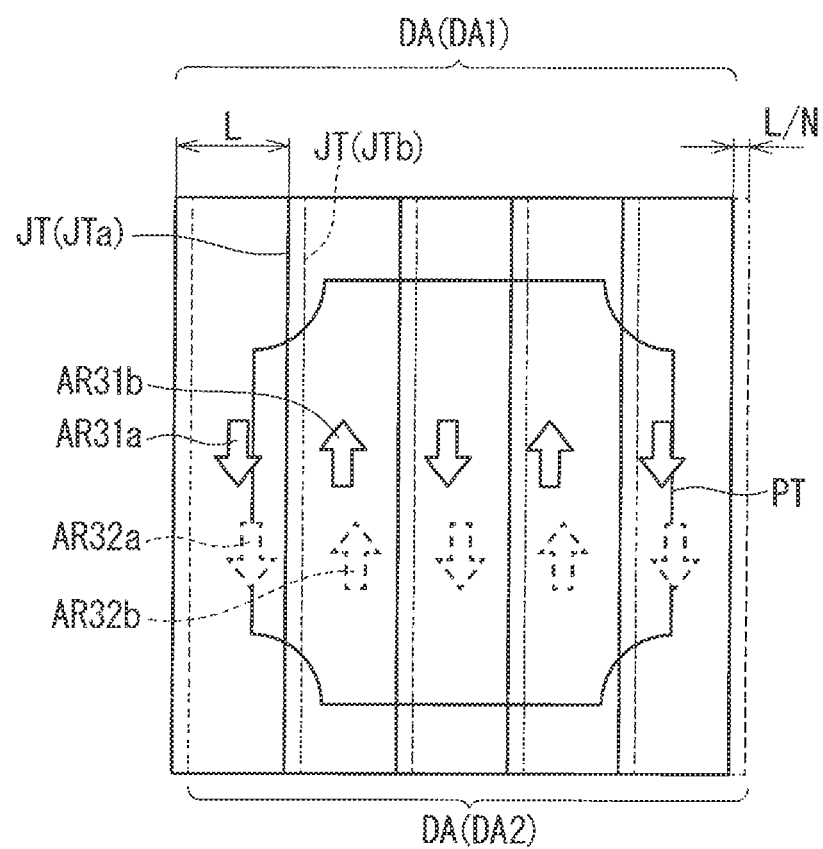
FIG. 26 is a diagram for explaining exposure to eliminate the effect of joint portions.

FIGS. 26 and 27A to C are diagrams each for explaining exposure to eliminate the effect of the joint portion. Specifically, FIG. 26 illustrates exposure in two vertically adjacent layers when N slurry films are used to form the object. While only one drawing pattern PT is illustrated in FIG. 26 for ease of illustration, the drawing pattern PT may differ among layers.

Generally, in the present embodiment, an in-plane position of the joint portion when each layer is exposed is intentionally shifted from an in-plane position (a horizontal position) of the joint portion in another layer. Taken as one example is a case where, in a case where a drawing area DA (DA1) of a lower slurry film is exposed for each drawing width L by causing the projector 21 to perform reciprocating movement as indicated by an arrow AR31a and an arrow AR31b, a drawing area DA (DA2) of a slurry film formed thereon is set so that a joint portion JT (JTb) therein is shifted by L/N in the positive x-axis direction from a joint portion JT (JTa) in the layer immediately below the layer, and the drawing area DA2 is similarly exposed for each drawing width L by causing the projector 21 to perform reciprocating movement as indicated by an arrow AR32a and an arrow AR32b as illustrated in FIG. 26. In the present disclosure, the "in-plane position" refers to a position at the surface of the slurry film SLF when viewed from a direction perpendicular to the slurry film SLF.

Figure 27A:
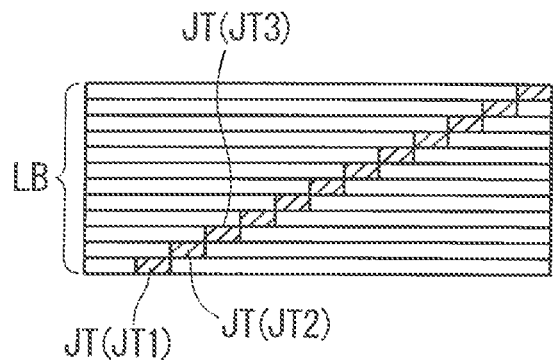
FIGS. 27A to 27C are diagrams for explaining exposure to eliminate the effect of joint portions.

In a case where the shift is performed in each layer, in the object as the laminated body LB of slurry films, the joint portion JT (JT1, JT2, JT3 . . . ) of adjacent strip regions in each layer is shifted in the horizontal direction for each layer as in a cross-sectional view illustrated in FIG. 27A. In this case, a shift amount of a joint portion in a slurry film SLF which is a k-th layer (1≤k≤N) counted from the bottom from a joint portion in a slurry film to be a first layer is represented by $(k-1)\cdot(L/N)$.

Although it seems that the drawing area DA comes not to cover the drawing pattern PT as laminating progresses in FIG. 26, this is for convenience of illustration. The size of the drawing area is actually determined according to the drawing pattern PT in each layer, and exposure in each layer is performed as strip exposure targeted for the drawing area DA set to cover the drawing pattern PT while the positional shift of the joint portion JT is performed.

Figure 27B:

A manner of the shift of the joint portion JT (JT1, JT2, JT3 . . . ) is not limited to a shift in one direction as illustrated in FIG. 27A and may be a shift that is substantially even in the horizontal direction as in a cross-sectional view illustrated in FIG. 27B, for example. A shift amount of the joint portion in the slurry film SLF to be the k-th layer in this case is expressed by $(-1)^{k-1}\cdot(k-1)\cdot(L/N)$ in view of a direction of the shift.

More generally, shift amounts in a first direction of the joint portion JT in respective layers of the N slurry films relative to the position of the joint portion JT in the first layer are integer multiples of L/N and vary one another.

A state of exposure of the joint portion is different from that of the other portions in a strict sense. In the present embodiment, the in-plane position of the joint portion JT in each layer is varied (distributed) and averaged in the object as the laminated body LB of the slurry films as in FIG. 27A or FIG. 27B, for example. Alternatively, the in-plane position of the joint portion JT may differ between at least two layers in the laminated body LB. It can be suitably reduced that the presence of the joint portion affects manufacturing accuracy, and the object having a high dimensional accuracy can be obtained. For example, even in a case where laminating and exposure are repeated for a several tens or hundreds of slurry films, it can be reduced that manufacturing accuracy is affected by accumulation of the effect on manufacturing accuracy in the joint portion (more specifically, a change in volume caused by a change in energy due to overlap exposure).

As described above, according to the present embodiment, in a case where formation (laminating) of the slurry film and exposure are repeated to obtain the three-dimensional object, the inclined scheme is employed for exposure of each layer with the projector to sequentially expose a plurality of strip regions according to the drawing width of the projector. The in-plane position of the joint portion in adjacent strip regions in at least one layer is then shifted from the in-plane position of the joint portion in at least one other layer. It can be suitably reduced that the presence of the joint portion affects manufacturing accuracy, and the object having a high dimensional accuracy can be obtained.

Figure 27C:
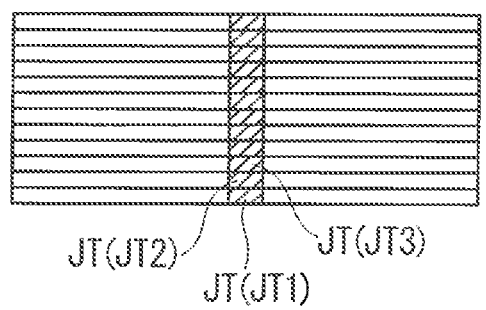

The position of the joint portion JT (JT1, JT2, JT3 . . . ) in each layer may be the same in the horizontal direction as in a cross-sectional view illustrated in FIG. 27C.

<Simultaneous Formation of Slurry Dispensing Region>

Manufacturing of the object with simultaneous formation of a slurry dispensing region will be described next, which is one example of the manufacturing of the object in the stereolithography apparatus 1 according to the present embodiment. FIGS. 28 to 32 are side views each schematically showing the stereolithography apparatus 1 during manufacturing in a case where the slurry dispensing region is formed simultaneously.

The slurry dispensing region is herein a region in which a slurry SL is dispensed in forming each layer in a case where the object is formed as the laminated body LB of the slurry films. Simultaneous formation of the slurry dispensing region refers to a scheme in which, prior to formation of a layer other than the first layer (a lowermost layer), a slurry dispensing region for a layer to be formed next is simultaneously formed with formation of a layer immediately below the layer by exposure curing of the slurry. When the first layer is formed, a slurry dispensing target region on the upper surface of the manufacturing table 11 onto which the film F is sucked and fixed is regarded as the slurry dispensing region.

Figure 28:
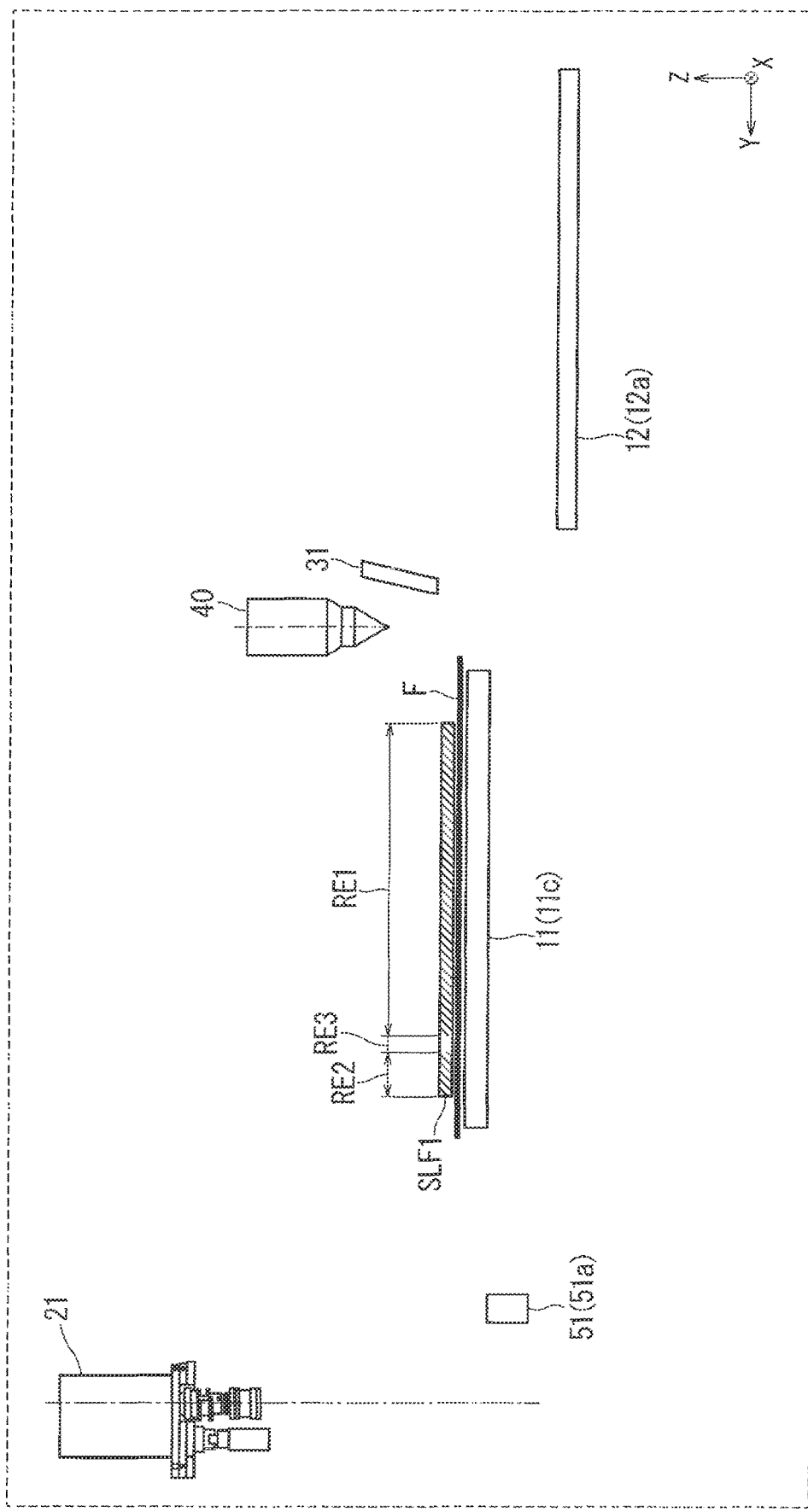
FIG. 28 is a side view schematically showing the stereolithography apparatus 1 during manufacturing in a case where a slurry dispensing region is formed simultaneously.

First, a state after formation of the first layer (lowermost layer) is illustrated in FIG. 28. The first layer is formed according to the above-mentioned procedures by dispensing the slurry SL from the slurry dispensing pump 40 onto the film F sucked and fixed onto the manufacturing table 11, sweeping the slurry SL using the recoater 31 to form a slurry film SLF1, and exposing the slurry film SLF1 according to a predetermined exposure pattern.

In forming the first layer, however, the slurry film SLF1 is formed not only in an object formation region RE1 in which application of the slurry is originally necessary for manufacturing of the object but also to be continuous with a slurry dispensing region RE2 set in a predetermined range more in the positive y-axis direction (closer to a sweeping start position of the recoater 31) than the object formation region RE1 is and a boundary region RE3 between the object formation region RE1 and the slurry dispensing region RE2.

In addition, a range of formation of the slurry film SLF1 is set so that a position of the center of gravity in a horizontal plane of the slurry film SLF1 substantially coincides with or is close to a position of the center of gravity in a horizontal plane of the manufacturing table 11.

The object formation region RE1 in which application of the slurry is originally necessary for manufacturing of the object is a region in which a portion photo-cured by exposure becomes the object. On the other hand, in the slurry dispensing region RE2, a photo-cured portion of an m-th layer (m is an integer equal to or greater than two) serves as a slurry dispensing table for an (m+1) layer.

In subsequent exposure, the object formation region RE1 is exposed according to the drawing pattern PT, and the slurry dispensing region RE2 is exposed together.

Figure 29:
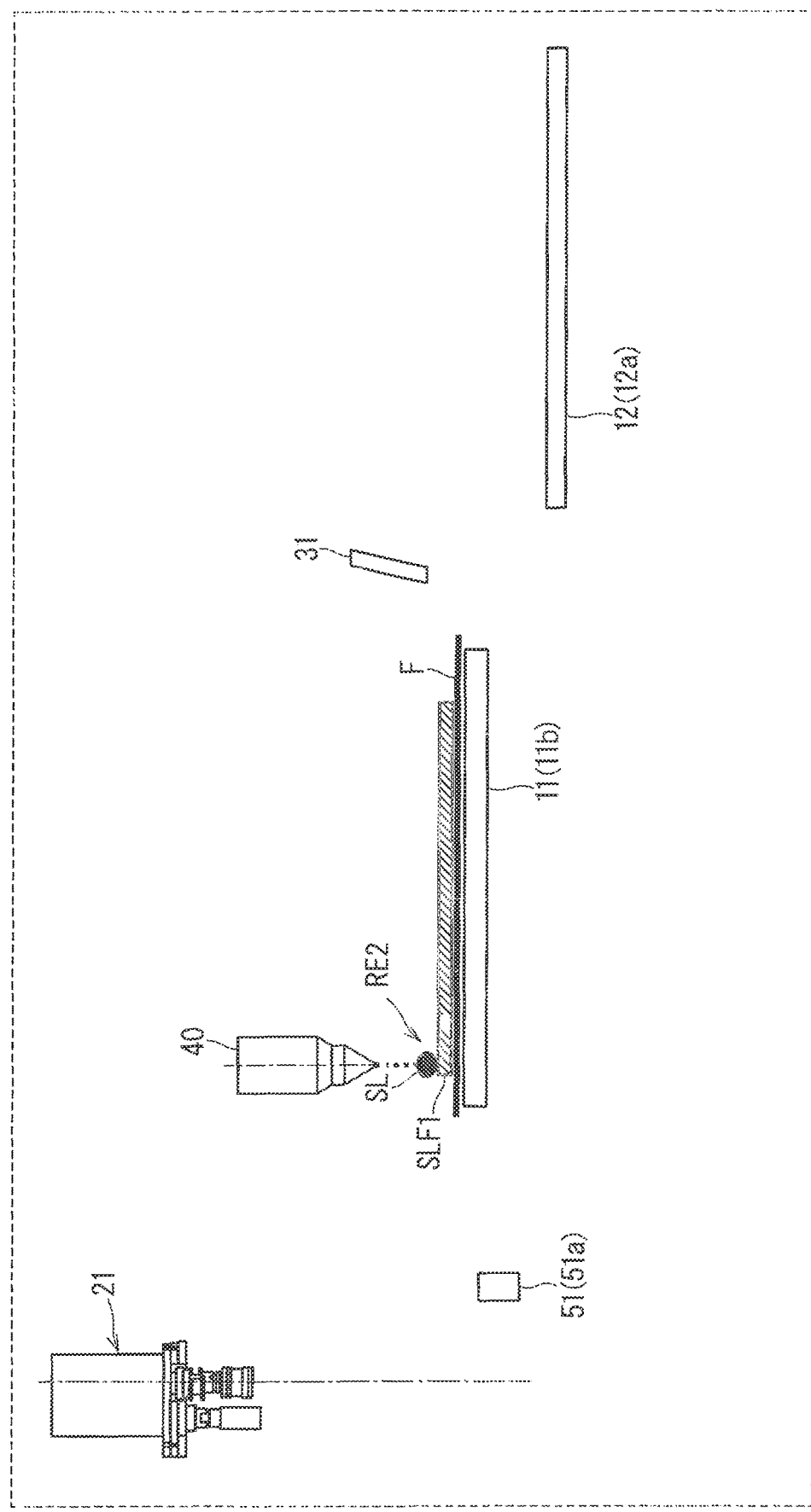
FIG. 29 is a side view schematically showing the stereolithography apparatus 1 during manufacturing in a case where the slurry dispensing region is formed simultaneously.
Figure 30:
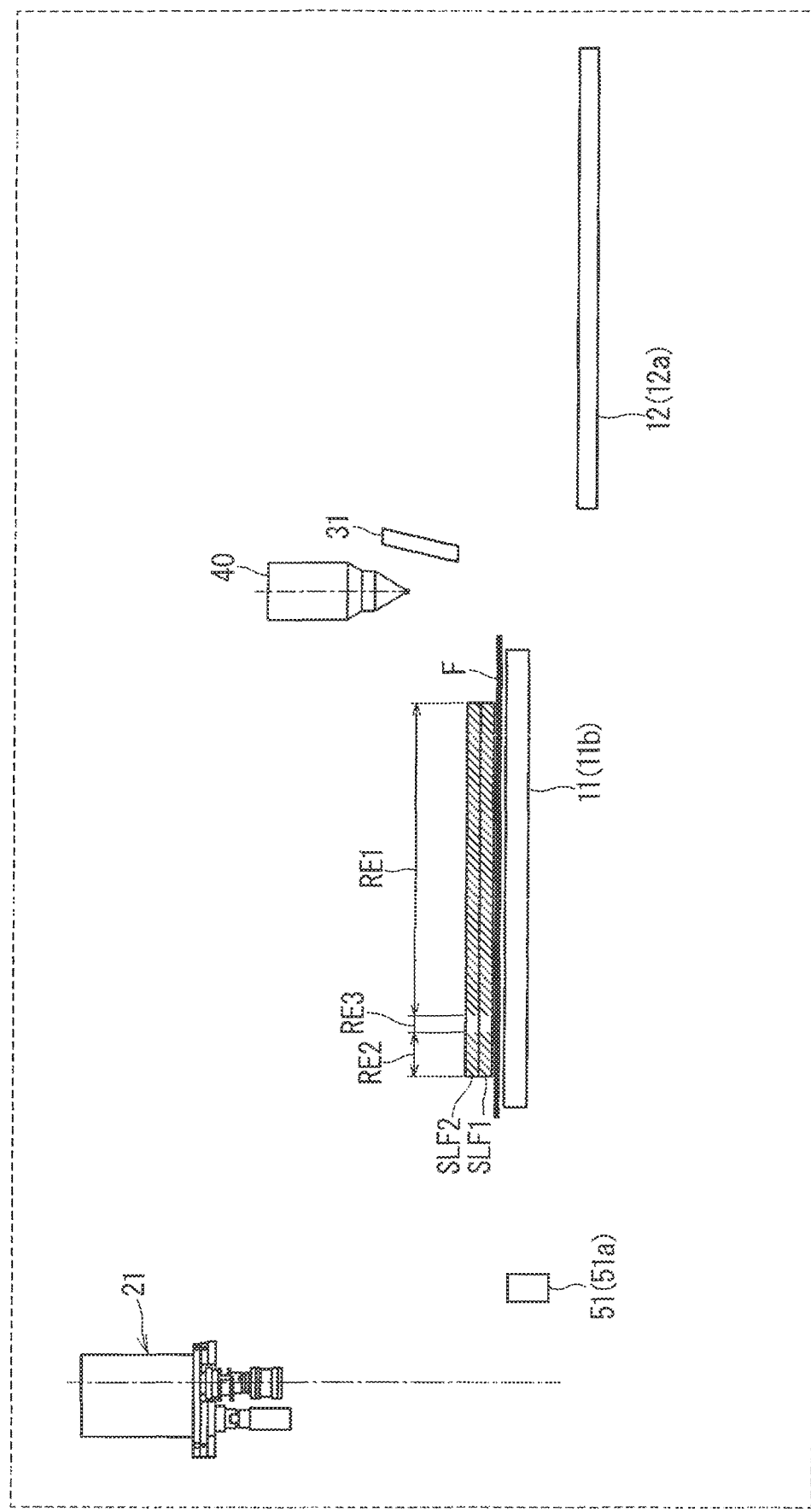
FIG. 30 is a side view schematically showing the stereolithography apparatus 1 during manufacturing in a case where the slurry dispensing region is formed simultaneously.

Next, dispensing of the slurry SL when a second layer is formed is illustrated in FIG. 29. FIG. 30 illustrates a state after formation of the second layer.

The second layer is formed by forming a slurry film SLF2 on the slurry film SLF1 (first layer) formed previously. In this case, the slurry SL is dispensed onto the slurry dispensing region RE2 of the first layer. The slurry dispensing region RE2 has been cured by exposure and is stable, so that dispensing of the slurry SL by the slurry dispensing pump 40 and subsequent sweeping by the recoater 31 are suitably performed. In forming the second layer, the slurry film SLF2 is formed so that the object formation region RE1, the slurry dispensing region RE2, and the boundary region RE3 are continuous as with the first layer. The slurry film SLF2 is formed on the slurry film SLF1, so that a position of the center of gravity in a horizontal plane of the slurry films as a whole still substantially coincides with or is close to the position of the center of gravity in the horizontal plane of the manufacturing table 11.

In subsequent exposure, the object formation region RE1 is exposed according to the drawing pattern PT, and the slurry dispensing region RE2 is also exposed as in formation of the first layer.

Similarly, as for formation of each of subsequent layers, the slurry SL is dispensed onto the slurry dispensing region RE2 of a slurry film SLF formed immediately before formation of the layer, the slurry SL is swept using the recoater 31 to form the slurry film SLF continuous in the object formation region RE1, the slurry dispensing region RE2, and the boundary region RE3, and exposure of the object formation region RE1 according to the drawing pattern PT and exposure of the slurry dispensing region RE2 are performed.

In this case, the position of the center of gravity in the horizontal plane of the slurry films as a whole always substantially coincides with or is close to the position of the center of gravity in the horizontal plane of the manufacturing table 11. Application of a biased load to the manufacturing table 11 is thus suitably reduced even in a case where the number of laminated layers is large and thus the object has a large weight. As a result, reduction in manufacturing accuracy (particularly exposure accuracy) caused by the biased load is suitably suppressed.

The slurry for formation of each layer is dispensed onto the slurry dispensing region RE2 formed immediately beforehand as a portion of the slurry film and cured by exposure, which renders stable sweeping.

Figure 31:
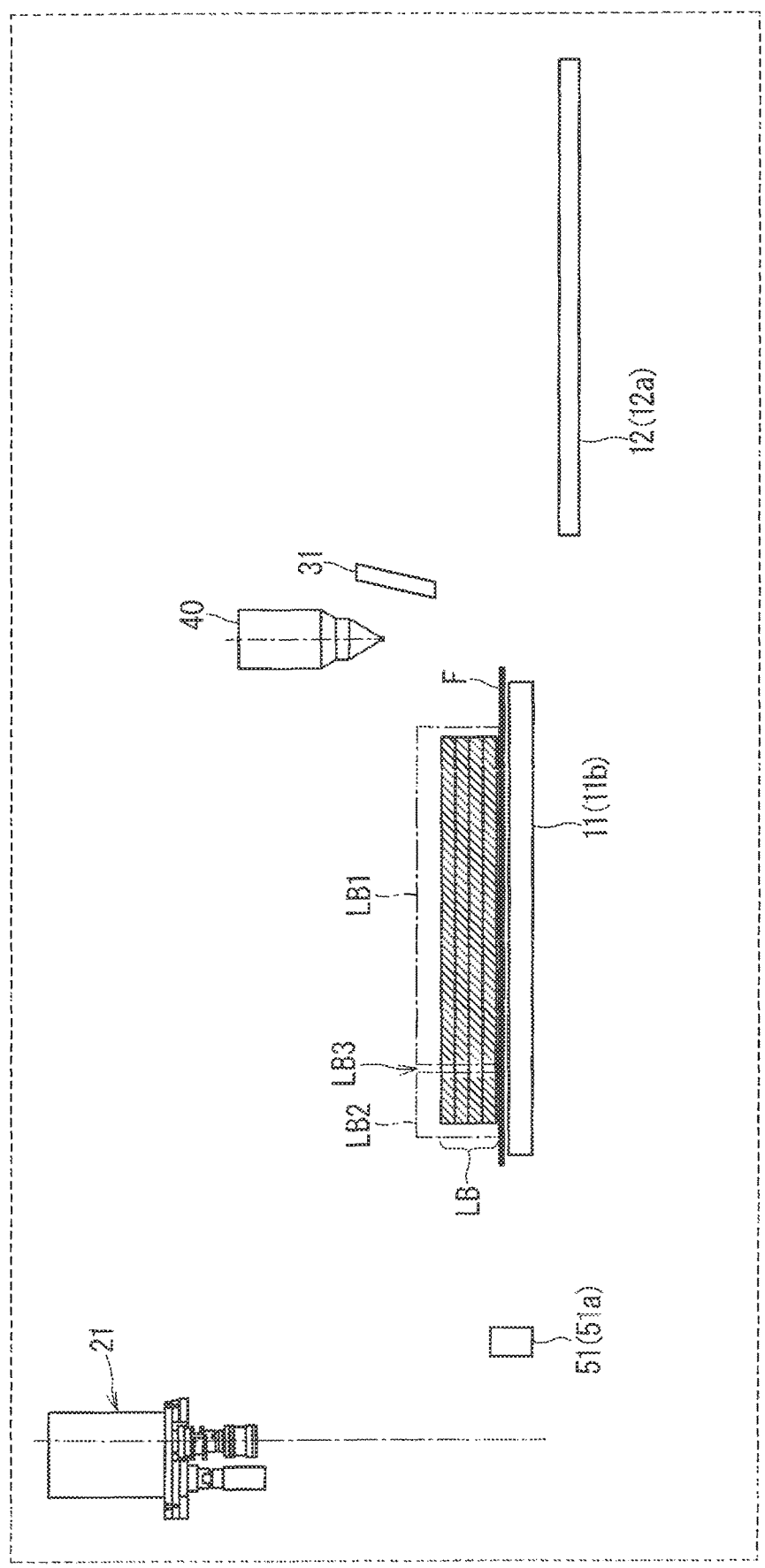
FIG. 31 is a side view schematically showing the stereolithography apparatus 1 during manufacturing in a case where the slurry dispensing region is formed simultaneously.

FIG. 31 illustrates the object formed as the laminated body LB of the slurry films by repeating formation of the slurry film SLF and exposure as described above. As illustrated in FIG. 31, the laminated body LB includes a laminated portion LB1 as an original object, a laminated portion LB2 in the slurry dispensing region RE2 provided for each layer, and an uncured laminated portion LB3 in the boundary region RE3 also provided for each layer.

The laminated body LB is eventually transported to the outside of the apparatus together with the auxiliary table 12 according to the above-mentioned procedures and, in this case, the uncured laminated portion LB3 is present between the laminated portion LB1 and the laminated portion LB2, and therefore, it is easy to separate the laminated portion LB1 from the laminated portion LB2 and further remove the laminated portion LB3 after transportation.

Figure 32:
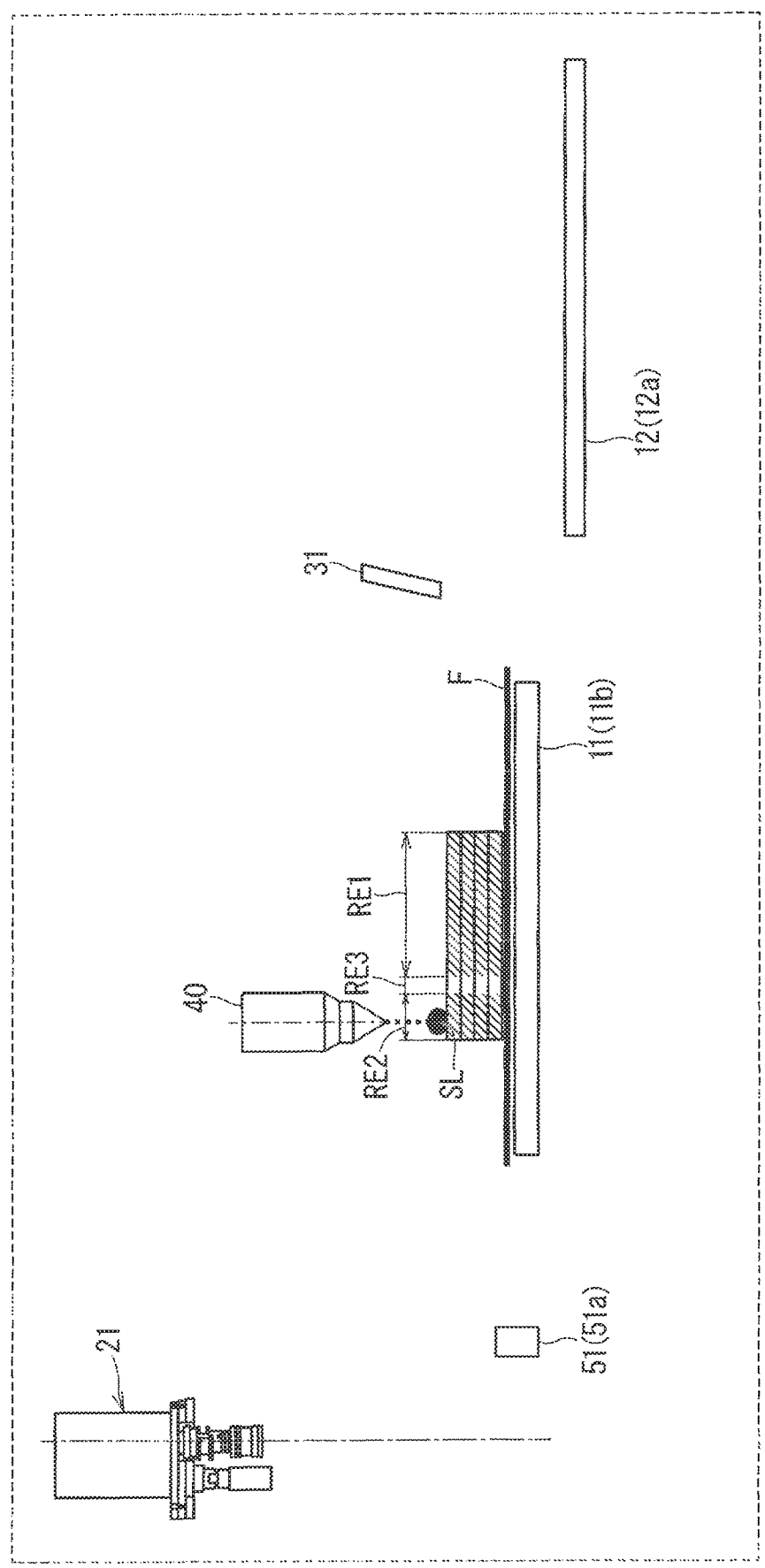
FIG. 32 is a side view illustrating manufacturing in a case where an object has a small planar size relative to a manufacturing table 11.

FIG. 32 is a diagram illustrating manufacturing (dispensing of the slurry SL) in a case where the object has a small planar size relative to the manufacturing table 11. Also in this case, the slurry SL is dispensed onto the slurry dispensing region RE2 of the slurry film SLF formed immediately beforehand, the slurry SL is swept using the recoater 31 to form the slurry film SLF continuous in the object formation region RE1, the slurry dispensing region RE2, and the boundary region RE3, and exposure of the object formation region RE1 according to the drawing pattern PT and exposure of the slurry dispensing region RE2 are performed just as in the above-mentioned case.

In addition, by causing the position of the center of gravity in the horizontal plane of the slurry film as a whole when the first layer is formed to substantially coincide with or be close to the position of the center of gravity in the horizontal plane of the manufacturing table 11, a position of the center of gravity in a horizontal plane of the laminated body formed thereafter can be maintained to substantially coincide with or be close to the position of the center of gravity in the horizontal plane of the manufacturing table 11, and application of the biased load to the manufacturing table 11 can be reduced as in the above-mentioned case.

Also in this case, the slurry dispensing region RE2 is formed at a position (specifically, a position close to the object formation region RE1 and closer to the center than that in a case where the object has a larger planar size) and to have a size according to the planar size of the object, so that the slurry film SLF including the object formation region RE1 having a necessary size can be formed using the slurry SL dispensed in a minimum necessary dispensing amount.

These effects can never be obtained in a case where a slurry is dispensed onto a liftable application mount (the auxiliary table) provided on a side of the manufacturing table, and a slurry film is laminated by sweeping of the slurry as disclosed in Patent Document 1. Assuming that an object having a small size as illustrated in FIG. 32 is manufactured at the center of the manufacturing table in a case where manufacturing is performed using such an application mount, the slurry is required to be swept from the application mount to the center, so that the slurry in an amount larger than that required for manufacturing is required to be used for sweeping, which is disadvantageous in terms of cost. When a position close to the application mount is set to the manufacturing position to avoid the foregoing, manufacturing is required to be performed at an end of the manufacturing table, resulting in a problem of the biased load. Performing manufacturing while forming the slurry dispensing region RE2 as described above can solve both disadvantages.

As described above, according to the present embodiment, in forming the slurry film by sweeping the slurry using the recoater, the slurry film is formed to include, in addition to the object formation region in which application of the slurry is originally necessary for manufacturing of the object, the slurry dispensing region set in the predetermined range closer to the sweeping start position of the recoater than the object formation region is and the boundary region between the object formation region and the slurry dispensing region, and the position of the center of gravity in the horizontal plane of the slurry film is caused to substantially coincide with or be close to the position of the center of gravity in the horizontal plane of the manufacturing table. Furthermore, in exposure of the object formation region according to the drawing pattern, the slurry dispensing region is also exposed. Thus, application of the biased load to the manufacturing table is suitably reduced, and reduction in manufacturing accuracy (exposure accuracy) caused by the biased load is suitably suppressed even in a case where the object has a large weight. On the other hand, in a case where the object has a small planar size, the slurry dispensing region can be formed at the position and to have the size according to the planar size of the object, so that the slurry film including the object formation region having a necessary size can be formed using the slurry dispensed in a minimum necessary dispensing amount while application of the biased load to the manufacturing table is suitably reduced.

Other Embodiments

In the above-mentioned embodiment, the slurry obtained by kneading the mixture of the photo-curable resin and the ceramic powder is used as the photo-curable material. A slurry including only the photo-curable resin and not including the ceramic powder may be used instead, and a slurry including another material, such as metal powder, in place of the ceramic powder may be used instead.

In the above-mentioned embodiment, the plurality of suction grooves 11g and 12g are used as a plurality of air supply ports of the manufacturing table 11 and the auxiliary table 12. Grooves or a plurality of holes provided in the manufacturing table 11 and/or the auxiliary table 12 separately from the plurality of suction grooves 11g and 12g may be used as the plurality of air supply ports instead. In this case, the compressed air pump of the air suction/blowout mechanism 11AR is connected to the plurality of air supply ports. In place of the plurality of suction grooves 11g and 12g for vacuum suction (and air supply), a plurality of suction holes may be used in the manufacturing table 11 and/or the auxiliary table 12. When the auxiliary table 12 separately has a plurality of air supply ports, the plurality of suction grooves 11g may not be provided.

In the above-mentioned embodiment, the film is adsorbed and fixed onto the manufacturing table 11. The film may be fixed to the manufacturing table 11 by being pulled downward while opposite ends thereof are held by a gripper instead.

In the above-mentioned embodiment, a transport device (carrier) including the suction pad unit 51 and the film gripper 52 is used as a transport means. A transport device including a holding device (holder) having another configuration may be used instead. The transport device may include an actuator for film transport. In the above-mentioned embodiment, the film mounted on the auxiliary table 12 may be transported to the manufacturing table 11 while being held by the gripper. The film mounted on the manufacturing table 11 may be transported to the auxiliary table 12 while being adsorbed by a suction pad.

In the above-mentioned embodiment, the exposure unit 20 as the light source including the projectors 21 is used as the exposure means. Laser scanning using a galvanometer mirror and another light source, such as a liquid crystal shutter, may be used instead.

Figure 33:
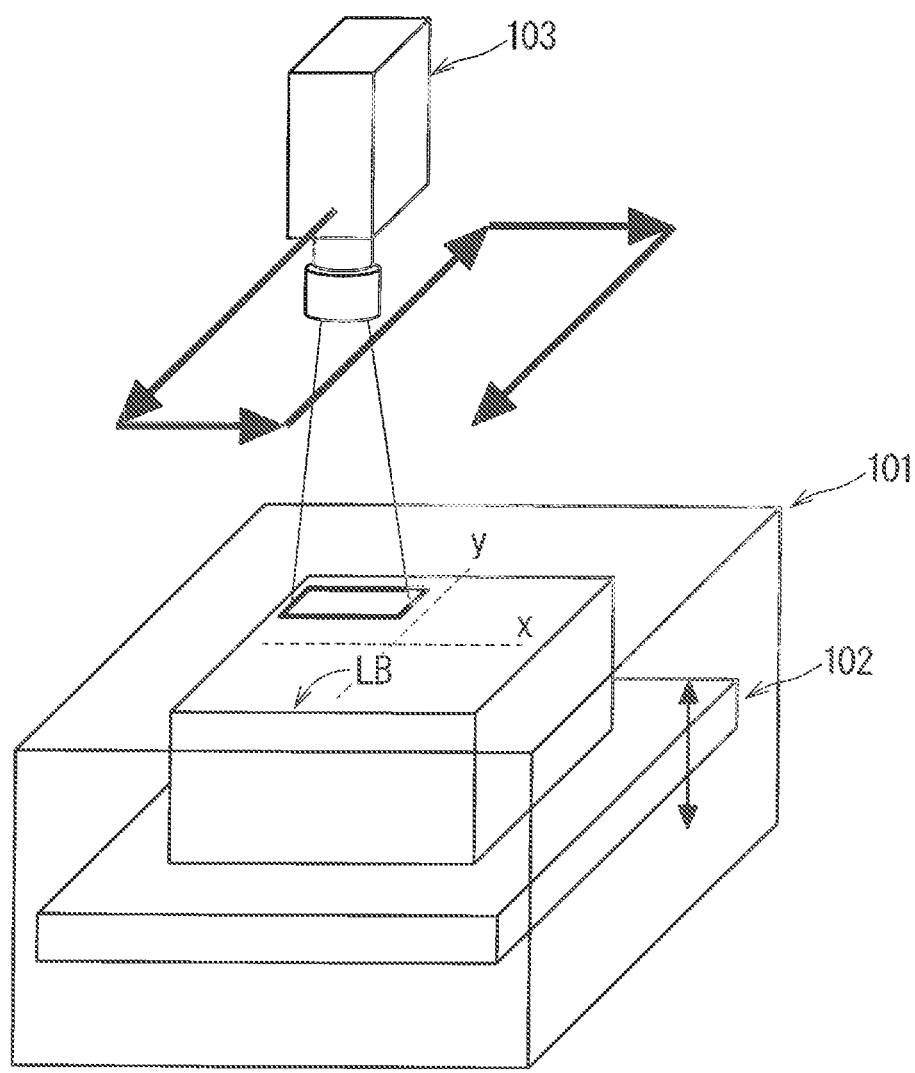
FIG. 33 is an overview diagram of an apparatus that forms a three-dimensional object by a free liquid level method.

In the above-mentioned embodiment, the apparatus that forms the three-dimensional object by application of the slurry and exposure is used as the stereolithography apparatus to obtain the three-dimensional object. An apparatus that forms the three-dimensional object by the free liquid level method using an exposure unit similar to the exposure unit 20 in the above-mentioned embodiment may be used instead. FIG. 33 is an overview diagram of an apparatus that forms the three-dimensional object by the free liquid level method. The apparatus illustrated in FIG. 33 includes a tank 101 that holds a photo-curable resin in a liquid state as a photo-curable material, a manufacturing stage 102 on which a three-dimensional object LB is mounted, and a projector 103 similar to that in the above-mentioned embodiment. Furthermore, an apparatus that forms the three-dimensional object by the regulated liquid level method or another method may be used as the stereolithography apparatus to obtain the three-dimensional object.

The invention claimed is:

1. A stereolithography apparatus for obtaining a three-dimensional object, comprising:
   an exposer configured to expose a photo-curable material according to an exposure pattern generated in advance based on three-dimensional shape data; and
   a controller configured to control operation of the stereolithography apparatus, wherein
   the exposer includes
      a projector that includes a plurality of pixels in a two-dimensional arrangement and is configured to individually switch ON-OFF states of exposure light at the respective pixels,
   the projector
      is movable in a second direction orthogonal to a first direction in a posture inclined with respect to the second direction so that center positions of two adjacent pixels of the plurality of pixels are offset by a predetermined drawing pitch in the first direction, and
      is configured to switch the ON-OFF states of the exposure light each time the projector moves a distance corresponding to the drawing pitch in the second direction, and
   the controller
      causes the projector to expose the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern while alternating forward movement and backward movement in the second direction with intervening step movement in the first direction, and
      forms, in a case where a plurality of layers of the photo-curable material are each exposed by the exposer while being laminated to obtain the three-dimensional object, a joint portion of two adjacent strip regions of the plurality of strip regions and causes an in-plane position of the joint portion to differ between at least two layers of the plurality of layers.

2. The stereolithography apparatus according to claim 1, wherein
   in a case where the plurality of layers of the photo-curable material are each exposed by the exposer while being laminated to obtain the three-dimensional object, the controller causes the in-plane position of the joint portion to differ among the plurality of layers.

3. The stereolithography apparatus according to claim 2, further comprising:
   a manufacturing table;
   a dispenser configured to dispense a slurry as the photo-curable material onto the manufacturing table; and
   a sweeper configured to sweep the slurry dispensed onto the manufacturing table to form a slurry film having a predetermined thickness, wherein
   the controller repeats dispensing of the slurry by the dispenser and sweeping of the dispensed slurry by the sweeper to laminate a plurality of slurry films as the plurality of layers.

4. The stereolithography apparatus according to claim 2, wherein
   the in-plane position of the joint portion when the projector exposes each of the plurality of layers is shifted by an integer multiple of L/N in the first direction from the in-plane position of the joint portion in a layer exposed first among the plurality of layers,
   where L is the drawing width, N is the number of laminated layers.

5. The stereolithography apparatus according to claim 4, further comprising:
   a manufacturing table;
   a dispenser configured to dispense a slurry as the photo-curable material onto the manufacturing table; and
   a sweeper configured to sweep the slurry dispensed onto the manufacturing table to form a slurry film having a predetermined thickness, wherein
   the controller repeats dispensing of the slurry by the dispenser and sweeping of the dispensed slurry by the sweeper to laminate a plurality of slurry films as the plurality of layers.

6. The stereolithography apparatus according to any-claim 1, further comprising:
   a manufacturing table;
   a dispenser configured to dispense a slurry as the photo-curable material onto the manufacturing table; and
   a sweeper configured to sweep the slurry dispensed onto the manufacturing table to form a slurry film having a predetermined thickness, wherein
   the controller repeats dispensing of the slurry by the dispenser and sweeping of the dispensed slurry by the sweeper to laminate a plurality of slurry films as the plurality of layers.

7. A stereolithography apparatus for obtaining a three-dimensional object, comprising:
   a manufacturing table;
   an exposer configured to expose a photo-curable material according to an exposure pattern generated in advance based on three-dimensional shape data;
   a dispenser configured to dispense a slurry as the photo-curable material onto the manufacturing table;
   a sweeper configured to sweep the slurry dispensed onto the manufacturing table to form a slurry film having a predetermined thickness; and
   a controller configured to control operation of the stereolithography apparatus, wherein the exposer includes
- a projector that includes a plurality of pixels in a two-dimensional arrangement and is configured to individually switch ON-OFF states of exposure light at the respective pixels, the projector
- is movable in a second direction orthogonal to a first direction in a posture inclined with respect to the second direction so that center positions of two adjacent pixels of the plurality of pixels are offset by a predetermined drawing pitch in the first direction, and
- is configured to switch the ON-OFF states of the exposure light each time the projector moves a distance corresponding to the drawing pitch in the second direction, and the controller
- causes the projector to expose the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern while alternating forward movement and backward movement in the second direction with intervening step movement in the first direction,
- repeats, in a case where a plurality of layers of the photo-curable material are each exposed by the exposer while being laminated to obtain the three-dimensional object, dispensing of the slurry by the dispenser and sweeping of the dispensed slurry by the sweeper to laminate a plurality of slurry films as the plurality of layers and forms a joint portion of two adjacent strip regions of the plurality of strip regions,
- controls, when the plurality of slurry films are each formed, at least the dispenser and the sweeper so that each of the slurry films includes not only a first region but also a second region and a third region, the first region being a region in which application of the slurry is originally necessary for manufacturing of the three-dimensional object, the second region being a region set in a predetermined range closer to a sweeping start position of the sweeper than the first region is, the third portion being a region between the first region and the second region,
- causes a position of a center of gravity in a horizontal plane of each of the slurry films to substantially coincide with or be close to a position of a center of gravity in a horizontal plane of the manufacturing table,
- causes the exposer to expose the second region when exposing the first region according to the exposure pattern, and
- causes, when an m-th layer of the plurality of slurry films is formed, the dispenser to dispense the slurry onto the second region of an (m−1) layer of the slurry films, m being an integer equal to or greater than two.

8. A method for manufacturing a three-dimensional object comprising
- an exposure step of exposing a photo-curable material according to an exposure pattern generated in advance based on three-dimensional shape data using a projector that includes a plurality of pixels in a two-dimensional arrangement and is configured to individually switch ON-OFF states of exposure light at the respective pixels, wherein
- in the exposure step, the projector is caused to expose, in a posture inclined with respect to a second direction orthogonal to a first direction so that center positions of two adjacent pixels of the plurality of pixels are offset by a predetermined drawing pitch in the first direction, the photo-curable material in a predetermined drawing area sequentially for a plurality of strip regions each extending in the second direction and having a predetermined drawing width in the first direction by individually switching the ON-OFF states of the exposure light at the respective pixels based on the exposure pattern each time the projector moves a distance corresponding to the drawing pitch while alternating forward movement and backward movement in the second direction with intervening step movement in the first direction, and
- in a case where a plurality of layers of the photo-curable material are each exposed in the exposure step while being laminated to obtain the three-dimensional object, a joint portion of two adjacent strip regions of the plurality of strip regions is formed, and an in-plane position of the joint portion is caused to differ between at least two layers of the plurality of layers.

* * * * *